(12) United States Patent
Sun

(10) Patent No.: US 11,966,017 B2
(45) Date of Patent: Apr. 23, 2024

(54) CAMERA OPTICAL LENS

(71) Applicant: AAC Optics (Changzhou) Co., Ltd., Changzhou (CN)

(72) Inventor: Wen Sun, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 705 days.

(21) Appl. No.: 17/131,781

(22) Filed: Dec. 23, 2020

(65) Prior Publication Data

US 2022/0011547 A1    Jan. 13, 2022

(30) Foreign Application Priority Data

Jul. 9, 2020   (CN) .......................... 202010654084.6

(51) Int. Cl.
| | | |
|---|---|---|
| *G02B 13/00* | (2006.01) | |
| *G02B 9/64* | (2006.01) | |
| *G02B 27/00* | (2006.01) | |

(52) U.S. Cl.
CPC ........... *G02B 13/0045* (2013.01); *G02B 9/64* (2013.01); *G02B 27/0025* (2013.01)

(58) Field of Classification Search
CPC .. F02B 1/04; F02B 29/00; F02B 29/06; F02B 31/00; G02B 13/0045; G02B 13/06; G02B 13/18; G02B 27/0025; G02B 9/64; Y02T 10/12
See application file for complete search history.

(56) References Cited

U.S. PATENT DOCUMENTS

| | | | | |
|---|---|---|---|---|
| 2020/0073092 A1* | 3/2020 | Chen | ....................... | G02B 13/18 |
| 2022/0011540 A1* | 1/2022 | Sun | ......................... | G02B 9/64 |
| 2022/0011541 A1* | 1/2022 | Sun | ........................ | G02B 13/18 |

\* cited by examiner

*Primary Examiner* — Collin X Beatty
(74) *Attorney, Agent, or Firm* — W&G Law Group

(57) ABSTRACT

A camera optical lens is provided. The camera optical lens includes seven lenses, and the seven lenses are sequentially arranged from an object side to an image side, i.e., a first lens having a negative refractive power, a second lens having a positive refractive power, a third lens, a fourth lens having a negative refractive power, a fifth lens having a positive refractive power, a sixth lens having a positive refractive power, and a seventh lens having a negative refractive power. At least one of the first lens to the seventh lens includes a free-form surface. The camera optical lens according to the present disclosure can achieve good optical performance and meet the design requirements of being ultra-thin, and having a wide-angle and a large apertures.

9 Claims, 12 Drawing Sheets

CAMERA OPTICAL LENS

TECHNICAL FIELD

The present disclosure relates to the field of optical lens, and more particularly, to a camera optical lens suitable for handheld terminal devices such as smart phones or digital cameras and suitable for camera devices such as monitors or PC lenses.

BACKGROUND

With the development of camera lenses, requirements for lens imaging have become higher and higher, and "night scene photography" and "background blur" of the lens have also become important indicators to measure imaging of the lens. At present, rotationally symmetric aspherical surfaces are mostly used, such aspherical surfaces only have sufficient degrees of freedom in a meridian plane, and off-axis aberrations cannot be well corrected. In addition, refractive power setting, lens spacing, and lens shape settings are insufficient in existing structures, resulting in insufficient ultra-thin and insufficient wide-angle. A free-form surface is of a non-rotationally symmetric surface, which can better balance aberrations and improve imaging quality, and processing of the free-form surface is gradually mature. With the increase in requirements for lens imaging, it is very important to add the free-form surface when designing the lens, especially in designs of wide-angle lenses and ultra-wide-angle lenses.

SUMMARY

In view of the problems, the present disclosure aims to provide a camera lens, which can have characteristics of being ultra-thin and having a wide-angle and a large-aperture while achieving a good optical performance.

In an embodiment, the present disclosure provides a camera optical lens. The camera optical lens includes, from an object side to an image side: a first lens having a negative refractive power; a second lens having a positive refractive power; a third lens; a fourth lens having a negative refractive power; a fifth lens having a positive refractive power; a sixth lens having a positive refractive power; and a seventh lens having a negative refractive power. At least one of the first lens, the second lens, the third lens, the fourth lens, the fifth lens, the sixth lens, or the seventh lens includes a free-form surface.

As an improvement, the camera optical lens satisfies: $1.50 \leq d2/d3 \leq 4.00$, where d2 denotes an on-axis distance from an image-side surface of the first lens to an object-side surface of the second lens, and d3 denotes an on-axis thickness of the second lens.

As an improvement, the camera optical lens satisfies: $-3.68 \leq f1/f \leq -1.08$, $-0.50 \leq (R1+R2)/(R1-R2) \leq 1.66$, and $0.03 \leq d1/TTL \leq 0.19$, where f denotes a focal length of the camera optical lens, f1 denotes a focal length of the first lens, R1 denotes a central curvature radius of an object-side surface of the first lens, R2 denotes a central curvature radius of an image-side surface of the first lens, d1 denotes an on-axis thickness of the first lens, and TTL denotes a total optical length from the object-side surface of the first lens to an image plane of the camera optical lens along an optic axis.

As an improvement, the camera optical lens satisfies: $0.51 \leq f2/f \leq 5.80$, $-8.28 \leq (R3+R4)/(R3-R4) \leq 0.19$, and $0.02 \leq d3/TTL \leq 0.16$, where f denotes a focal length of the camera optical lens, f2 denotes a focal length of the second lens, R3 denotes a central curvature radius of an object-side surface of the second lens, R4 denotes a central curvature radius of an image-side surface of the second lens, d3 denotes an on-axis thickness of the second lens, and TTL denotes a total optical length from an object-side surface of the first lens to an image plane of the camera optical lens along an optic axis.

As an improvement, the camera optical lens satisfies: $-18.37 \leq f3/f \leq 4.43$, $-3.09 \leq (R5+R6)/(R5-R6) \leq 1.98$, and $0.02 \leq d5/TTL \leq 0.21$, where f denotes a focal length of the camera optical lens, f3 denotes a focal length of the third lens, R5 denotes a central curvature radius of an object-side surface of the third lens, R6 denotes a central curvature radius of an image-side surface of the third lens, d5 denotes an on-axis thickness of the third lens, and TTL denotes a total optical length from an object-side surface of the first lens to an image plane of the camera optical lens along an optic axis.

As an improvement, the camera optical lens satisfies: $-5.87 \leq f4/f \leq -1.39$, $-0.23 \leq (R7+R8)/(R7-R8) \leq 2.09$, and $0.02 \leq d7/TTL \leq 0.06$, where f denotes a focal length of the camera optical lens, f4 denotes a focal length of the fourth lens, R7 denotes a central curvature radius of an object-side surface of the fourth lens; R8 denotes a central curvature radius of an image-side surface of the fourth lens, d7 denotes an on-axis thickness of the fourth lens, and TTL denotes a total optical length from an object-side surface of the first lens to an image plane of the camera optical lens along an optic axis.

As an improvement, the camera optical lens satisfies: $1.18 \leq f5/f \leq 9.88$, $-1.67 \leq (R9+R10)/(R9-R10) \leq 0.54$, and $0.04 \leq d9/TTL \leq 0.15$, where f denotes a focal length of the camera optical lens, f5 denotes a focal length of the fifth lens, R9 denotes a central curvature radius of an object-side surface of the fifth lens, R10 denotes a central curvature radius of an image-side surface of the fifth lens, d9 denotes an on-axis thickness of the fifth lens, and TTL denotes a total optical length from an object-side surface of the first lens to an image plane of the camera optical lens along an optic axis.

As an improvement, the camera optical lens satisfies: $0.55 \leq f6/f \leq 3.56$, $0.67 \leq (R11+R12)/(R11-R12) \leq 3.57$, and $0.04 \leq d11/TTL \leq 0.17$, where f denotes a focal length of the camera optical lens, f6 denotes a focal length of the sixth lens, R11 denotes a central curvature radius of an object-side surface of the sixth lens, R12 denotes a central curvature radius of an image-side surface of the sixth lens, d11 denotes an on-axis thickness of the sixth lens, and TTL denotes a total optical length from an object-side surface of the first lens to an image plane of the camera optical lens along an optic axis.

As an improvement, the camera optical lens satisfies: $-12.55 \leq f7/f \leq -0.84$, $1.40 \leq (R13+R14)/(R13-R14) \leq 9.96$, and $0.03 \leq d13/TTL \leq 0.10$, where f denotes a focal length of the camera optical lens, f7 denotes a focal length of the seventh lens, R13 denotes a central curvature radius of an object-side surface of the seventh lens, R14 denotes a central curvature radius of an image-side surface of the seventh lens, d13 denotes an on-axis thickness of the seventh lens, and TTL denotes a total optical length from an object-side surface of the first lens to an image plane of the camera optical lens along an optic axis.

As an improvement, the camera optical lens satisfies: $FNO \leq 1.96$, where FNO denotes an F number of the camera optical lens.

The camera optical lens of the present disclosure has a good optical performance and has characteristic of being ultra-thin and having a wide-angle and a large aperture. At least one lens of the first to seventh lenses has a free-form surface, which can effectively correct aberrations and further improve the performance of the optical system. The camera optical lens is suitable for camera lens assembly of mobile phones and WEB camera lenses that are formed by imaging elements for high pixel, such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
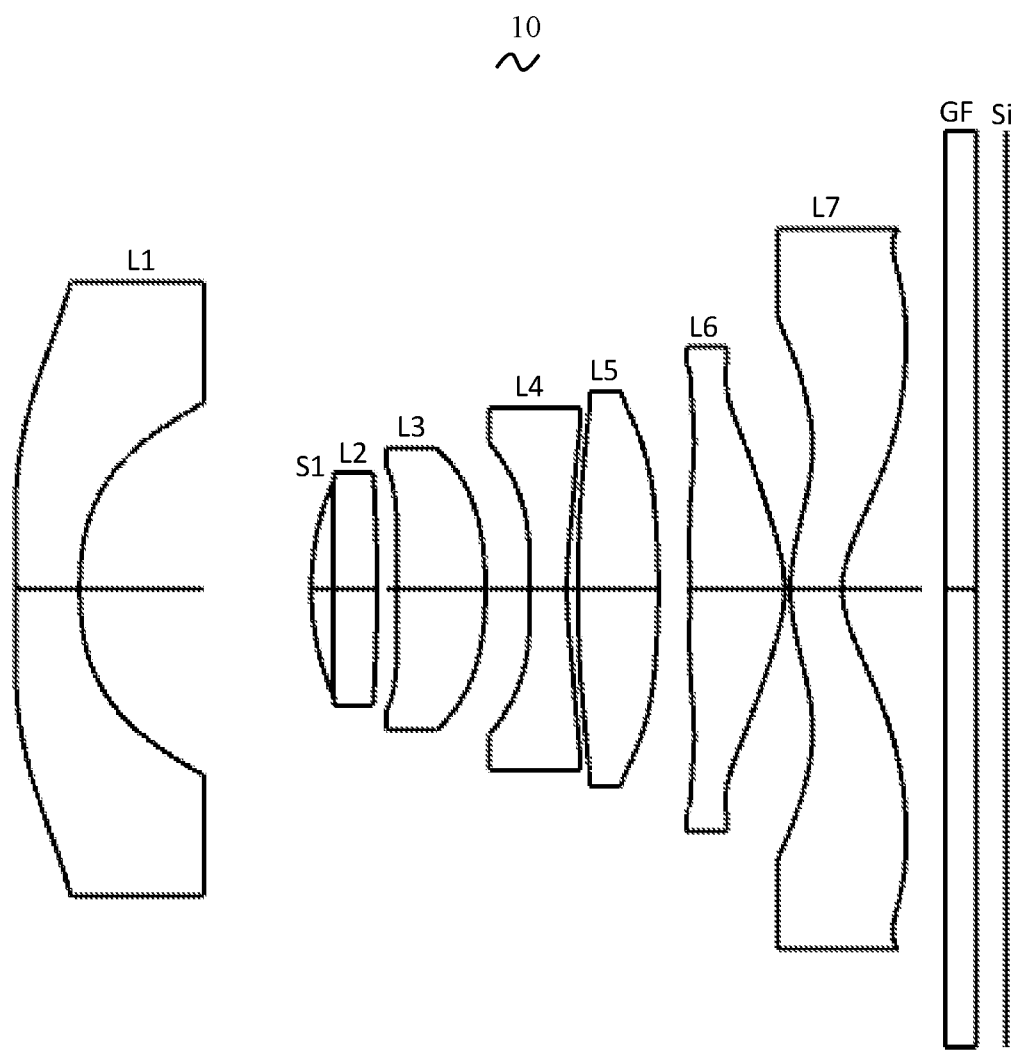
FIG. 1 is a schematic diagram of a structure of a camera optical lens in accordance with Embodiment 1 of the present disclosure.

Referring to FIG. 1, the present disclosure provides a camera optical lens 10. FIG. 1 shows the camera optical lens 10 according to Embodiment 1 of the present disclosure. The camera optical lens 10 includes seven lenses. Specifically, the camera optical lens 10 includes a first lens L1, an aperture S1, a second lens L2, a third lens L3, a fourth lens L4, a fifth lens L5, a sixth lens L6, and a seventh lens L7 that are sequentially arranged from an object side to an image side. An optical element such as an optical filter (GF) can be arranged between the seventh lens L7 and an image plane Si.

In this embodiment, the first lens L1 is made of a plastic material, the second lens L2 is made of a plastic material, the third lens L3 is made of a plastic material, the fourth lens L4 is made of a plastic material, the fifth lens L5 is made of a plastic material, the sixth lens L6 is made of a plastic material, and the seventh lens L7 is made of a plastic material.

In this embodiment, the first lens L1 has a negative refractive power, the second lens L2 has a positive refractive power, and the fourth lens L4 has a negative refractive power.

In this embodiment, at least one of at least one of the first lens L1, the second lens L2, the third lens L3, the fourth lens L4, the fifth lens L5, the sixth lens L6, or the seventh lens L7 includes a free-form surface, and therefore aberrations can be effectively corrected, which further improves a performance of the optical system.

In an example, an on-axis distance from an image-side surface of the first lens L1 to an object-side surface of the second lens L2 is defined as d2, an on-axis thickness of the second lens L2 is defined as d3, and $1.50 \leq d2/d3 \leq 4.00$. When d2/d3 satisfies the condition, an air spacing distance between the first lens and the second lens and a core thickness of the second lens can be effectively distributed, which can correct aberrations in the condition range and improve the imaging quality. As an example, $1.75 \leq d2/d3 \leq 3.76$.

In this embodiment, the first lens L1 includes an object-side surface being concave in a paraxial region and an image-side surface being concave in the paraxial region.

In an example, a focal length of the first lens L1 is defined as f1, a focal length of the camera optical lens 10 is defined as f, and the camera optical lens 10 satisfies: $-3.68 \leq f1/f \leq -1.08$, which specifics a ratio of the focal length f1 of the first lens L1 to the focal length f of the camera optical lens. When the condition is satisfied, the first lens L1 can have an appropriate negative refractive power, thereby facilitating reducing aberrations of the system while facilitating development towards ultra-thin and wide-angle. As an example, $-2.30 \leq f1/f \leq -1.35$.

As an example, a central curvature radius of the object-side surface of the first lens L1 is defined as R1, a central curvature radius of the image-side surface of the first lens L1 is defined as R2, and the camera optical lens 10 satisfies a condition of $-0.50 \leq (R1+R2)/(R1-R2) \leq 1.66$. Such configuration can reasonably control a shape of the first lens L1, so that the first lens L1 can effectively correct the spherical aberration of the system. As an example, $-0.31 \leq (R1+R2)/(R1-R2) \leq 1.33$.

As an example, an on-axis thickness of the first lens L1 is defined as d1, a total optical length from the object-side surface of the first lens L1 to the image plane of the camera optical lens 10 along an optic axis is defined as TTL, and the camera optical lens 10 satisfies a condition of $0.03 \leq d1/TTL \leq 0.19$. Such configuration can facilitate achieving ultra-thin lenses. As an example, $0.04 \leq d1/TTL \leq 0.15$.

The second lens L2 includes an object-side surface being convex in a paraxial region and an image-side surface being convex in the paraxial region.

As an example, a focal length of the second lens L2 is defined as f2, the focal length of the camera optical lens 10 is defined as f, and the camera optical lens 10 satisfies a condition of $0.51 \leq f2/f \leq 5.80$. By controlling the positive refractive power of the second lens L2 within a reasonable range, correction of aberrations of the optical system can be facilitated. As an example, $0.82 \leq f2/f \leq 4.64$.

As an example, a central curvature radius of the object-side surface of the second lens L2 is defined as R3, a central curvature radius of the image-side surface of the second lens L2 is defined as R4, and the camera optical lens 10 satisfies a condition of $-8.28 \leq (R3+R4)/(R3-R4) \leq 0.19$, which specifies a shape of the second lens L2. Such configuration can facilitate correction of an on-axis aberration with development towards ultra-thin lenses. As an example, $-5.17 \leq (R3+R4)/(R3-R4) \leq 0.15$.

As an example, an on-axis thickness of the second lens L2 is defined as d3, the total optical length from the object-side surface of the first lens L1 to an image plane of the camera optical lens 10 along an optic axis is defined as TTL, and the camera optical lens 10 satisfies a condition of $0.02 \leq d3/TTL \leq 0.16$. Such configuration can facilitate achieving ultra-thin lenses. As an example, $0.04 \leq d3/TTL \leq 0.13$.

As an example, the third lens L3 has a positive refractive power, and it includes an object-side surface being concave in a paraxial region and an image-side surface being convex in the paraxial region.

As an example, a focal length of the camera optical lens 10 is f, a focal length of the third lens L3 is f3, and the camera optical lens 10 satisfies a condition of $-18.37 \leq f3/f \leq 4.43$. The appropriate distribution of the refractive power leads to better imaging quality and a lower sensitivity of the system. As an example, $-11.48 \leq f3/f \leq 3.54$.

As an example, a central curvature radius of the object-side surface of the third lens L3 is defined as R5, a central curvature radius of the image-side surface of the third lens L3 is defined as R6, and the camera optical lens 10 satisfies a condition of $-3.09 \leq (R5+R6)/(R5-R6) \leq 1.98$. With such configuration, a shape of the third lens L3 is controlled. This configuration can alleviate the deflection degree of light passing through the lens with such condition while effectively reducing aberrations. As an example, $-1.93 \leq (R5+R6)/(R5-R6) \leq 1.58$.

As an example, an on-axis thickness of the third lens L3 is defined as d5, the total optical length from the object-side surface of the first lens L1 to an image plane of the camera optical lens 10 along an optic axis is defined as TTL, and the camera optical lens 10 satisfies a condition of $0.02 \leq d5/TTL \leq 0.21$, which can facilitate achieving ultra-thin lenses. As an example, $0.03 \leq d5/TTL \leq 0.17$.

In an example, the fourth lens L4 includes an object-side surface being concave in a paraxial region and an image-side surface being concave in the paraxial region.

As an example, a focal length of the fourth lens L4 is defined as f4, the focal length of the camera optical lens 10 is defined as f, and the camera optical lens 10 satisfies a condition of $-5.87 \leq f4/f \leq -1.39$, which specifies a ratio of the focal length f4 of the fourth lens L4 to the focal length f of the system. Such condition can improve the performance of the optical system. As an example, $-3.67 \leq f4/f \leq -1.73$.

As an example, a central curvature radius of the object-side surface of the fourth lens L4 is defined as R7, a central curvature radius of the image-side surface of the fourth lens L4 is defined as R8, and the camera optical lens 10 satisfies a condition of $-0.23 \leq (R7+R8)/(R7-R8) \leq 2.09$, which specifies a shape of the fourth lens L4. This can facilitate correction of an off-axis aberration with development towards ultra-thin and wide-angle lenses. As an example, $-0.15 \leq (R7+R8)/(R7-R8) \leq 1.67$.

As an example, an on-axis thickness of the fourth lens L4 is defined as d7, the total optical length from the object-side surface of the first lens L1 to an image plane of the camera optical lens 10 along an optic axis is defined as TTL, and the camera optical lens 10 satisfies a condition of $0.02 \leq d7/TTL \leq 0.06$. Such configuration can facilitate achieving ultra-thin lenses. As an example, $0.03 \leq d7/TTL \leq 0.05$.

The fifth lens L5 has a positive refractive power, and it includes an object-side surface being convex in a paraxial region and an image-side surface being convex in the paraxial region.

As an example, a focal length of the fifth lens L5 is f5, the focal length of the camera optical lens 10 is f, and the camera optical lens 10 further satisfies a condition of $1.18 \leq f5/f \leq 9.88$. This condition can effectively make a light angle of the camera optical lens 10 gentle and reduce the tolerance sensitivity. As an example, $1.89 \leq f5/f \leq 7.90$.

As an example, a central curvature radius of the object-side surface of the fifth lens L5 is defined as R9, a central curvature radius of the image-side surface of the fifth lens L5 is defined as R10, and the camera optical lens 10 satisfies a condition of $-1.67 \leq (R9+R10)/(R9-R10) \leq 0.54$, which specifies a shape of the fifth lens L5. This can facilitate correction of an off-axis aberration with development towards ultra-thin, wide-angle lenses. As an example, $-1.05 \leq (R9+R10)/(R9-R10) \leq 0.43$.

As an example, an on-axis thickness of the fifth lens L5 is defined as d9, the total optical length from the object-side surface of the first lens L1 to an image plane of the camera optical lens 10 along an optic axis is defined as TTL, and the camera optical lens 10 satisfies a condition of $0.04 \leq d9/TTL \leq 0.15$. This can facilitate achieving ultra-thin lenses. As an example, $0.06 \leq d9/TTL \leq 0.12$.

The sixth lens L6 has a positive refractive power, and it includes an object-side surface being concave in a paraxial region and an image-side surface being convex in the paraxial region.

As an example, a focal length of the sixth lens L6 is f6, the focal length of the camera optical lens 10 is f, and the camera optical lens 10 satisfies a condition of $0.55 \leq f6/f \leq 3.56$. With such condition, the appropriate distribution of the refractive power leads to better imaging quality and a lower sensitivity of the system. As an example, $0.87 \leq f6/f \leq 2.84$.

As an example, a central curvature radius of the object-side surface of the sixth lens L6 is defined as R11, a central curvature radius of the image-side surface of the sixth lens L6 is defined as R12, and the camera optical lens 10 satisfies a condition of $0.67 \leq (R11+R12)/(R11-R12) \leq 3.57$, which specifies a shape of the sixth lens L6. Such configuration can facilitate correction of an off-axis aberration with development towards ultra-thin and wide-angle lenses. As an example, $1.08 \leq (R11+R12)/(R11-R12) \leq 2.86$.

As an example, an on-axis thickness of the sixth lens L6 is defined as d11, the total optical length from the object-side surface of the first lens L1 to an image plane of the camera optical lens 10 along an optic axis is defined as TTL, and the camera optical lens 10 satisfies a condition of $0.04 \leq d11/TTL \leq 0.17$. Such configuration can facilitate achieving ultra-thin lenses. As an example, $0.06 \leq d11/TTL \leq 0.13$.

The seventh lens L7 has a negative refractive power, and it includes an object-side surface being convex in a paraxial region and an image-side surface being concave in the paraxial region.

As an example, a focal length of the seventh lens L7 is f7, a focal length of the camera optical lens 10 is f, and the camera optical lens 10 satisfies a condition of −12.55≤f7/f≤−0.84. The appropriate distribution of the refractive power leads to better imaging quality and a lower sensitivity of the system. As an example, −7.84≤f7/f≤−1.05.

As an example, a central curvature radius of the object-side surface of the seventh lens L7 is defined as R13, a central curvature radius of the image-side surface of the seventh lens L7 is defined as R14, and the camera optical lens 10 satisfies a condition of 1.40≤(R13+R14)/(R13−R14) ≤9.96, which specifies a shape of the seventh lens L7. Such configuration can facilitate correction of an off-axis aberration with development towards ultra-thin and wide-angle lenses. As an example, 2.24≤(R13+R14)/(R13−R14)≤7.97.

As an example, an on-axis thickness of the seventh lens L7 is defined as d13, the total optical length from the object-side surface of the first lens L1 to an image plane of the camera optical lens 10 along an optic axis is defined as TTL, and the camera optical lens 10 satisfies a condition of 0.03≤d13/TTL≤0.10. Such configuration can facilitate achieving ultra-thin lenses. As an example, 0.04≤d13/TTL≤0.08.

As an example, a, an F number (FNO) of the camera optical lens 10 is smaller than or equal to 1.96, thereby leading to a large aperture and high imaging performance.

As an example, the total optical length TTL of the camera optical lens 10 is smaller than or equal to 7.38 mm, which is beneficial for achieving ultra-thin lenses. As an example, the total optical length TTL of the camera optical lens 10 is smaller than or equal to 7.05 mm.

When the above relationship is satisfied, the camera optical lens 10 has good optical performance, and adopting a free-form surface can achieve matching of a design image area with an actual use area, to maximize the image quality of an effective area. With these characteristics, the camera optical lens 10 is suitable for camera optical lens assembly of mobile phones and WEB camera optical lenses formed by imaging elements for high pixel such as CCD and CMOS.

In the following, examples will describe the camera optical lens 10 of the present disclosure. The symbols recorded in each example will be described as follows. The focal length, on-axis distance, central curvature radius, and on-axis thickness are all in units of mm.

TTL: Optical length (the total optical length from the object-side surface of the first lens L1 to the image plane of the camera optical lens along the optic axis), in a unit of mm.

F number (FNO): a ratio of an effective focal length of the camera optical lens to an entrance pupil diameter of the camera optical lens.

Table 1 and Table 2 shows design data of the camera optical lens 10 according to Embodiment 1 of the present disclosure. The object-side surface and the image-side surface of the seventh lens L7 are free-form surfaces.

TABLE 1

| | R | d | | nd | | vd |
|---|---|---|---|---|---|---|
| S1 | ∞ | d0= | −2.152 | | | |
| R1 | −8.763 | d1= | 0.431 | nd1 | 1.5450 | v1 | 56.00 |
| R2 | 2.141 | d2= | 1.570 | | | |
| R3 | 1.970 | d3= | 0.446 | nd2 | 1.5450 | v2 | 56.00 |

TABLE 1-continued

| | R | d | | nd | | vd |
|---|---|---|---|---|---|---|
| R4 | −7.686 | d4= | 0.134 | | | |
| R5 | −440.844 | d5= | 0.598 | nd3 | 1.5450 | v3 | 56.00 |
| R6 | −2.753 | d6= | 0.301 | | | |
| R7 | −44.102 | d7= | 0.250 | nd4 | 1.6610 | v4 | 20.53 |
| R8 | 2.532 | d8= | 0.075 | | | |
| R9 | 9.962 | d9= | 0.546 | nd5 | 1.5450 | v5 | 56.00 |
| R10 | −4.712 | d10= | 0.212 | | | |
| R11 | −6.170 | d11= | 0.642 | nd6 | 1.5450 | v6 | 56.00 |
| R12 | −0.910 | d12= | 0.040 | | | |
| R13 | 1.223 | d13= | 0.350 | nd7 | 1.6449 | v7 | 22.54 |
| R14 | 0.580 | d14= | 0.700 | | | |
| R15 | ∞ | d15= | 0.210 | ndg | 1.5168 | vg | 64.17 |
| R16 | ∞ | d16= | 0.205 | | | |

In the table, meanings of various symbols will be described as follows.

S1: aperture;

R: central curvature radius of an optical surface, central curvature radius for a lens;

R1: central curvature radius of the object-side surface of the first lens L1;

R2: central curvature radius of the image-side surface of the first lens L1;

R3: central curvature radius of the object-side surface of the second lens L2;

R4: central curvature radius of the image-side surface of the second lens L2;

R5: central curvature radius of the object-side surface of the third lens L3;

R6: central curvature radius of the image-side surface of the third lens L3;

R7: central curvature radius of the object-side surface of the fourth lens L4;

R8: central curvature radius of the image-side surface of the fourth lens L4;

R9: central curvature radius of the object-side surface of the fifth lens L5;

R10: central curvature radius of the image-side surface of the fifth lens L5;

R11: central curvature radius of the object-side surface of the sixth lens L6;

R12: central curvature radius of the image-side surface of the sixth lens L6;

R13: central curvature radius of the object-side surface of the sixth lens L7;

R14: central curvature radius of the image-side surface of the sixth lens L7;

R15: central curvature radius of an object-side surface of the optical filter GF;

R16: central curvature radius of an image-side surface of the optical filter GF;

d: on-axis thickness of a lens, an on-axis distance between lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the sixth lens L6;
d11: on-axis thickness of the sixth lens L6;
d12: on-axis distance from the image-side surface of the fifth lens L6 to the object-side surface of the seventh lens L7;
d13: on-axis thickness of the seventh lens L7;
d14: on-axis distance from the image-side surface of the seventh lens L7 to the object-side surface of the optical filter GF and to the image plane;
d15: on-axis thickness of the optical filter GF;
d16: on-axis distance from the image-side surface of the optical filter GF to the image plane;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the seventh lens L7;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
vg: abbe number of the optical filter GF.

Table 2 shows aspherical data of respective lens in the camera optical lens 10 according to Embodiment 1 of the present disclosure.

TABLE 2

| | Conic coefficient | Aspherical coefficients | | | | |
|---|---|---|---|---|---|---|
| | k | A4 | A6 | A8 | A10 | A12 |
| R1  | −1.0000E+01 | 1.7139E−01  | −1.1762E−01 | 6.0951E−02  | −2.3043E−02 | 5.9285E−03  |
| R2  | 1.1723E+00  | 2.0618E−01  | 3.8121E−02  | −2.9519E−01 | 4.6078E−01  | −3.7763E−01 |
| R3  | 8.8249E−01  | 1.5180E−02  | 1.3245E−02  | −2.0679E−03 | 0.0000E+00  | 0.0000E+00  |
| R4  | −1.0000E+01 | 4.5719E−02  | −1.1086E−02 | −2.5785E−02 | 2.3998E−02  | 0.0000E+00  |
| R5  | 1.0000E+01  | −4.2585E−02 | −1.3029E−01 | 5.1606E−02  | −2.0282E−01 | 8.9802E−02  |
| R6  | 3.6383E+00  | −1.7318E−01 | 2.5392E−02  | 3.7683E−03  | −3.0594E−02 | 9.6083E−03  |
| R7  | 5.0000E+00  | −5.1173E−01 | 4.2993E−01  | −7.9952E−01 | 1.9398E+00  | −2.5922E+00 |
| R8  | 1.4572E+00  | −3.5765E−01 | 4.2919E−01  | −3.1287E−01 | 8.4065E−02  | 4.2853E−02  |
| R9  | 1.0000E+01  | 3.9474E−03  | −3.1737E−02 | 2.0851E−01  | −3.8764E−01 | 2.9311E−01  |
| R10 | −9.9301E+00 | 2.2305E−01  | −8.5167E−01 | 1.6500E+00  | −2.4274E+00 | 2.6935E+00  |
| R11 | 9.9966E+00  | 5.4178E−01  | −1.1598E+00 | 1.6779E+00  | −1.7641E+00 | 1.2783E+00  |
| R12 | −6.2865E+00 | 7.6522E−02  | −9.3793E−02 | −3.3626E−02 | 2.7094E−01  | −4.0524E−01 |
| | Conic coefficient | Aspherical coefficients | | | | |
| | k | A14 | A16 | A18 | A20 | |
| R1  | −1.0000E+01 | −9.8228E−04 | 9.4520E−05  | −4.0101E−06 | 0.0000E+00  | |
| R2  | 1.1723E+00  | 1.7712E−01  | −4.7046E−02 | 5.3184E−03  | 0.0000E+00  | |
| R3  | 8.8249E−01  | 0.0000E+00  | 0.0000E+00  | 0.0000E+00  | 0.0000E+00  | |
| R4  | −1.0000E+01 | 0.0000E+00  | 0.0000E+00  | 0.0000E+00  | 0.0000E+00  | |
| R5  | 1.0000E+01  | 0.0000E+00  | 0.0000E+00  | 0.0000E+00  | 0.0000E+00  | |
| R6  | 3.6383E+00  | 0.0000E+00  | 0.0000E+00  | 0.0000E+00  | 0.0000E+00  | |
| R7  | 5.0000E+00  | 1.7598E+00  | −5.1071E−01 | 0.0000E+00  | 0.0000E+00  | |
| R8  | 1.4572E+00  | −3.2508E−02 | 3.9269E−03  | 0.0000E+00  | 0.0000E+00  | |
| R9  | 1.0000E+01  | −9.0746E−02 | 7.7130E−03  | 0.0000E+00  | 0.0000E+00  | |
| R10 | −9.9301E+00 | −2.0724E+00 | 1.0060E+00  | −2.7232E−01 | 3.1148E−02  | |
| R11 | 9.9966E+00  | −6.1662E−01 | 1.9166E−01  | −3.5094E−02 | 2.8679E−03  | |
| R12 | −6.2865E+00 | 3.0157E−01  | −1.2000E−01 | 2.4343E−02  | −1.9820E−03 | |

$$z=(cr^2)/[1+\{1-(k+1)(c^2r^2)\}^{1/2}]+A4x^4+A6x^6+A8x^8+A10x^{10}+A12x^{12}+A14x^{14}+A16x^{16}+A18x^{18}+A20x^{20} \quad (1),$$

In Table 2, k is a conic coefficient, and A4, A6, A8, A10, A12, A14, A16, A18 and A20 are aspherical coefficients, r is a vertical distance between a point on an aspherical curve and the optic axis, and z is an aspherical depth (a vertical distance between a point on an aspherical surface, having a distance of r from the optic axis, and a surface tangent to a vertex of the aspherical surface on the optic axis).

For convenience, an aspherical surface of each lens surface uses the aspherical surfaces shown in the above condition (1). However, the present disclosure is not limited to the aspherical polynomial form shown in the condition (1).

Table 3 shows free-form surface data in the camera optical lens 10 of Embodiment 1 of the present disclosure.

TABLE 3

| | Free-form surface coefficients | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R13 | −3.4905E+00 | −2.4590E−01 | −4.8916E−01 | −2.4393E−01 | 1.2875E−01 | 3.7690E−01 | 3.7818E−01 | 1.2728E−01 |
| R14 | −4.0081E+00 | −9.7910E−02 | −1.9644E−01 | −9.3989E−02 | 2.5457E−02 | 7.8863E−02 | 7.7196E−02 | 1.9850E−02 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R13 | 3.8804E−01 | 2.0233E−01 | 4.2157E−02 | −1.2937E−02 | −7.7070E−02 | −1.9697E−01 | −2.6166E−01 | −1.9104E−01 |
| R14 | −2.8468E−03 | −3.2621E−04 | −4.6037E−05 | 5.6622E−05 | 3.2839E−04 | 1.5269E−03 | 1.4059E−03 | 8.4177E−04 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R13 | 1.3345E−02 | 1.9400E−03 | −1.0501E−04 | −1.0796E−03 | −4.1878E−03 | −8.2329E−03 | −1.0227E−02 | −8.3908E−03 |
| R14 | −1.0804E−04 | 2.9726E−04 | 7.3615E−07 | 1.1810E−06 | 3.7947E−07 | −7.8630E−06 | 2.2139E−05 | −2.5069E−05 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R13 | 0.0000E+00 | 0.0000E+00 | 0.0000E+00 | 0.0000E+00 | 0.0000E+00 | 0.0000E+00 | 0.0000E+00 | 0.0000E+00 |
| R14 | 0.0000E+00 | 0.0000E+00 | 0.0000E+00 | 0.0000E+00 | 0.0000E+00 | 0.0000E+00 | 0.0000E+00 | 0.0000E+00 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R13 | −7.4567E−02 | −2.8543E−01 | −4.2351E−01 | −2.9516E−01 | −7.5649E−02 | 4.0352E−02 | 1.9439E−01 | 3.8947E−01 |
| R14 | −1.9434E−03 | −8.9938E−03 | −9.5365E−03 | −1.1868E−02 | 1.3373E−03 | −2.9772E−04 | −1.3502E−03 | −5.1997E−03 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R13 | −7.7916E−02 | −1.3591E−02 | 1.9822E−03 | 1.4807E−02 | 4.6806E−02 | 7.7738E−02 | 7.7087E−02 | 4.2422E−02 |
| R14 | 5.8785E−04 | −9.4221E−04 | −6.6441E−06 | −2.5053E−05 | −1.2672E−04 | −9.4816E−05 | −1.3608E−04 | −1.9707E−04 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R13 | −3.0760E−03 | −5.4278E−04 | −8.2578E−05 | 0.0000E+00 | 0.0000E+00 | 0.0000E+00 | 0.0000E+00 | 0.0000E+00 |
| R14 | 2.8726E−05 | 1.5639E−05 | −2.5412E−05 | 0.0000E+00 | 0.0000E+00 | 0.0000E+00 | 0.0000E+00 | 0.0000E+00 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R13 | 0.0000E+00 | 0.0000E+00 | 0.0000E+00 | 0.0000E+00 | 0.0000E+00 | 0.0000E+00 | 0.0000E+00 | 0.0000E+00 |
| R14 | 0.0000E+00 | 0.0000E+00 | 0.0000E+00 | 0.0000E+00 | 0.0000E+00 | 0.0000E+00 | 0.0000E+00 | 0.0000E+00 |

$$z = \frac{cr^2}{1 + \sqrt{1 - (1+k)c^2r^2}} + \sum_{i=1}^{N} B_i E_i(x, y),$$

where k is a conic coefficient, $B_i$ is an aspherical coefficient, r is a vertical distance between a point on a free-form surface and the optic axis, x is an x-direction component of r, y is a y-direction component of r, and z is the aspherical depth (a vertical distance between a point on an aspherical surface, having a distance of r from the optic axis, and a surface tangent to a vertex of the aspherical surface on the optic axis).

For convenience, each free-form surface uses an extended polynomial surface shown in the above formula (2). However, the present disclosure is not limited to the free-form surface polynomial form expressed by the formula (2).

Figure 2:
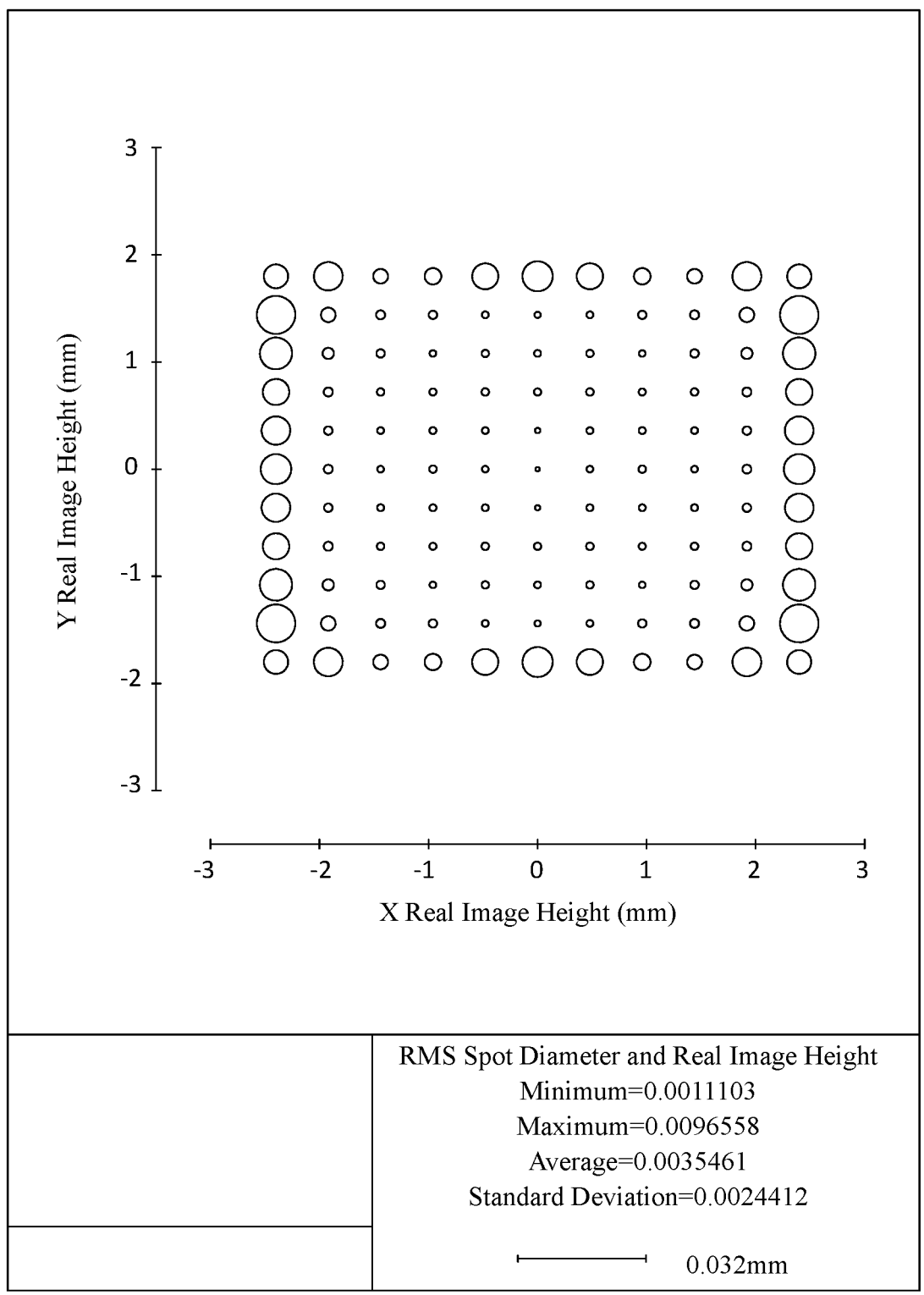
FIG. 2 is diagram showing a case where an RMS spot diameter of a camera optical lens shown in FIG. 1 is within a first quadrant.

FIG. 2 shows a case where an RMS spot diameter of the camera optical lens 10 of Embodiment 1 is within a first quadrant. According to FIG. 2, it can be known that the camera optical lens 10 of Embodiment 1 can achieve good imaging quality.

Table 19 below further lists various values of Embodiments 1, 2, 3, 4, 5 and 6 and values corresponding to parameters which are specified in the above conditions.

As shown in Table 19, Embodiment 1 satisfies the respective conditions.

As an example, the entrance pupil diameter ENPD of the camera optical lens is 0.927 mm, the image height (along a diagonal direction) IH is 6.000 mm, an image height in the x direction is 4.800 mm, an image height in the y direction is 3.600 mm, and the imaging effect is the best in the rectangular range. The field of view (FOV) along a diagonal direction is 120.90°, an FOV in the x direction is 108.59°, and an FOV in the y direction is 92.88°. Thus, the camera optical lens 10 satisfies design requirements of ultra-thin, large-aperture, and wide-angle while having on-axis and off-axis aberrations sufficiently corrected, thereby leading to better optical characteristics.

Embodiment 2

Embodiment 2 is basically the same as Embodiment 1 and involves symbols having the same meanings as Embodiment 1. Only differences therebetween will be described in the following.

Figure 3:
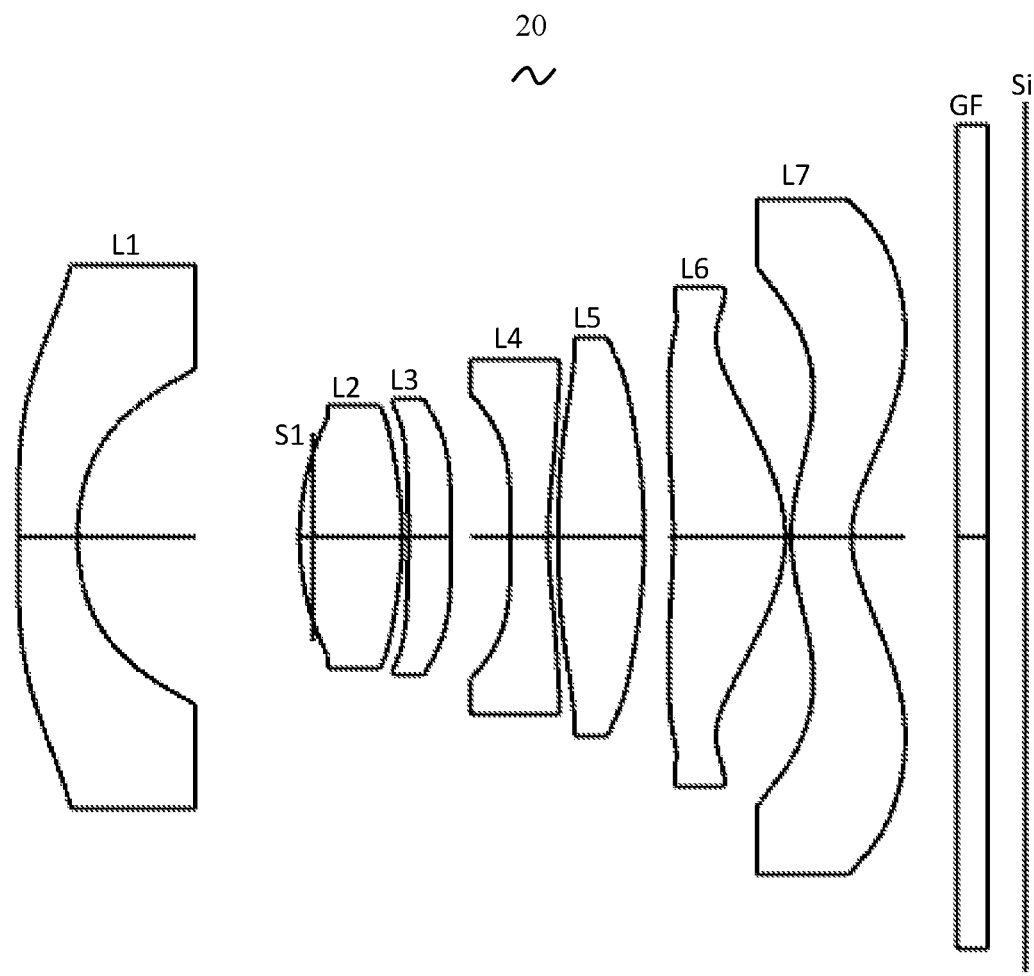
FIG. 3 is a schematic diagram of a structure of a camera optical lens in accordance with Embodiment 2 of the present disclosure.

FIG. 3 shows the camera optical lens 20 according to Embodiment 2 of the present disclosure. The camera optical lens 20 includes seven lenses. Specifically, the camera optical lens 20 includes a first lens L1 having a negative refractive power, an aperture S1, a second lens L2 having a positive refractive power, a third lens L3 having a negative refractive power, a fourth lens L4 having a negative refractive power, a fifth lens L5 having a positive refractive power, a sixth lens L6 having a positive refractive power, and a seventh lens L7 having a negative refractive power, which are sequentially arranged from an object side to an image side. An optical element such as an optical filter (GF) can be arranged between the seventh lens L7 and an image plane Si.

In this embodiment, the third lens L3 has a negative refractive power, and the object-side surface of the fourth lens L4 is convex in the paraxial region.

Table 4 and Table 5 show design data of a camera optical lens 20 in Embodiment 2 of the present disclosure.

TABLE 4

| | R | d | | nd | | vd |
|---|---|---|---|---|---|---|
| S1 | ∞ | d0= | −1.960 | | | |
| R1 | −18.118 | d1= | 0.396 | nd1 | 1.5444 | v1 | 56.43 |
| R2 | 1.772 | d2= | 1.478 | | | |
| R3 | 1.989 | d3= | 0.686 | nd2 | 1.5444 | v2 | 56.43 |
| R4 | −2.043 | d4= | 0.040 | | | |
| R5 | −7.064 | d5= | 0.285 | nd3 | 1.5660 | v3 | 37.70 |
| R6 | −32.958 | d6= | 0.394 | | | |

TABLE 4-continued

| | R | d | | nd | | vd |
|---|---|---|---|---|---|---|
| R7 | 25.296 | d7= | 0.250 | nd4 | 1.6800 | v4 | 18.40 |
| R8 | 2.285 | d8= | 0.066 | | | |
| R9 | 4.045 | d9= | 0.575 | nd5 | 1.5444 | v5 | 56.43 |
| R10 | −4.717 | d10= | 0.195 | | | |
| R11 | −4.035 | d11= | 0.746 | nd6 | 1.5444 | v6 | 56.43 |
| R12 | −1.002 | d12= | 0.040 | | | |
| R13 | 1.313 | d13= | 0.400 | nd7 | 1.6800 | v7 | 18.40 |
| R14 | 0.707 | d14= | 0.700 | | | |
| R15 | ∞ | d15= | 0.210 | ndg | 1.5168 | vg | 64.17 |
| R16 | ∞ | d16= | 0.250 | | | |

Table 5 shows aspherical data of respective lenses in the camera optical lens 20 according to Embodiment 2 of the present disclosure.

TABLE 5

| | Conic coefficient | Aspherical coefficients | | | | |
|---|---|---|---|---|---|---|
| | k | A4 | A6 | A8 | A10 | A12 |
| R1 | −1.0000E+01 | 1.8701E−01 | −1.5949E−01 | 1.1370E−01 | −6.4541E−02 | 2.7069E−02 |
| R2 | 9.7133E−01 | 2.3225E−01 | −4.9308E−02 | −2.0980E−01 | 5.7946E−01 | −7.9213E−01 |
| R3 | 4.3974E−01 | 5.8544E−03 | 1.0769E−01 | −8.5966E−01 | 4.1379E+00 | −1.2446E+01 |
| R4 | −1.0000E+01 | 3.0304E−01 | −1.4663E+00 | 5.3020E+00 | −1.4891E+01 | 3.0674E+01 |
| R5 | −2.3437E+00 | 3.1675E−01 | −1.6875E+00 | 5.6038E+00 | −1.4604E+01 | 2.6452E+01 |
| R6 | 1.0000E+01 | −2.1692E−01 | −1.7163E−02 | −1.9178E−04 | 6.2713E−02 | −9.8165E−02 |
| R7 | 9.7176E+00 | −4.1916E−01 | 3.2109E−01 | −7.6824E−01 | −1.4430E+00 | 5.4120E+01 |
| R8 | 9.0629E−01 | −6.0080E−01 | 1.7598E+00 | −4.2352E+00 | 6.8495E+00 | −7.2809E+00 |
| R9 | 2.9678E+00 | −4.7127E−01 | 1.8116E+00 | −3.8264E+00 | 5.0663E+00 | −4 4044E+00 |
| R10 | −1.6125E+00 | −7.4129E−02 | 3.1306E−01 | −6.7598E−01 | 9.7532E−01 | −1.0134E+00 |
| R11 | 1.7399E+00 | 2.0800E−01 | −2.2973E−01 | 2.6016E−01 | −2.4880E−01 | 1.4784E−01 |
| R12 | −5.7073E+00 | −1.8385E−01 | 3.6778E−01 | −5.7759E−01 | 7.2276E−01 | −6.1980E−01 |

| | Conic coefficient | Aspherical coefficients | | | |
|---|---|---|---|---|---|
| | k | A14 | A16 | A18 | A20 |
| R1 | −1.0000E+01 | −7.9973E−03 | 1.5578E−03 | −1.7850E−04 | 9.0862E−06 |
| R2 | 9.7133E−01 | 6.4626E−01 | −3.0353E−01 | 6.5737E−02 | −4.3645E−03 |
| R3 | 4.3974E−01 | 2.3554E+01 | −2.7588E+01 | 1.8321E+01 | −5.3335E+00 |
| R4 | −1.0000E+01 | −4.3839E+01 | 4.0221E+01 | −2.1198E+01 | 4.8500E+00 |
| R5 | −2.3437E+00 | −3.1262E+01 | 2.1869E+01 | −7.7276E+00 | 9.8134E−01 |
| R6 | 1.0000E+01 | 2.3998E−01 | −3.9104E−01 | 2.1867E−01 | 2.0410E−02 |
| R7 | 9.7176E+00 | −1.1881E+01 | 1.2312E+01 | −6.6294E+00 | 1.4978E+00 |
| R8 | 9.0629E−01 | 5.0476E+00 | −2.2014E+00 | 5.4773E−01 | −5.9368E−02 |
| R9 | 2.9678E+00 | 2.5110E+00 | −9.1684E−01 | 2.0050E−01 | −2.0780E−02 |
| R10 | −1.6125E+00 | 7.4839E−01 | −3.6838E−01 | 1.0528E−01 | −1.2868E−02 |
| R11 | 1.7399E+00 | −3.8523E−02 | −3.2028E−03 | 3.8925E−03 | −6.0384E−04 |
| R12 | −5.7073E+00 | 3.3970E−01 | −1.1132E−01 | 1.9684E−02 | −1.4408E−03 |

Table 6 shows free-form surface data in the camera optical lens 20 of Embodiment 2 of the present disclosure.

TABLE 6

| | Free-form surface coefficients | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R13 | −2.6686E+00 | −2.8714E−01 | −5.7755E−01 | −2.8624E−01 | 2.1357E−01 | 6.4036E−01 | 6.4590E−01 | 2.1204E−01 |
| R14 | −3.9794E+00 | −1.1642E−01 | −2.3707E−01 | −1.1451E−01 | 4.9700E−02 | 1.5213E−01 | 1.5564E−01 | 4.7194E−02 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R13 | 1.1323E+00 | 5.6700E−01 | 1.1415E−01 | −6.0976E−02 | −3.6619E−01 | −9.1615E−01 | −1.2216E+00 | −9.1534E−01 |
| R14 | 7.0285E−02 | 3.5621E−02 | 7.2168E−03 | −1.6069E−03 | −9.6786E−03 | −2.4239E−02 | −3.1958E−02 | −2.4156E−02 |

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R13 | 1.6918E−01 | 2.4015E−02 | −6.4382E−03 | −5.1482E−02 | −1.7986E−01 | −3.5966E−01 | −4.5009E−01 | −3.5933E−01 |
| R14 | 1.5255E−03 | 2.0662E−04 | −1.4695E−05 | −1.1645E−04 | −3.9214E−04 | −8.0505E−04 | −1.0229E−03 | −7.8574E−04 |

TABLE 6-continued

| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|---|
| R13 | 1.2614E−01 | 8.4074E−02 | 3.6243E−02 | 8.9827E−03 | 1.0027E−03 | −6.7601E−05 | −6.6729E−04 | −3.0556E−03 |
| R14 | −8.0022E−07 | 1.3669E−06 | 2.8266E−06 | −3.6060E−06 | −6.9587E−07 | 4.4489E−08 | 4.7581E−07 | 1.3355E−06 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R13 | −1.6734E−01 | −6.6509E−01 | −9.9955E−01 | −6.7037E−01 | −1.6726E−01 | 1.1358E−01 | 5.6612E−01 | 1.1326E+00 |
| R14 | −2.1010E−02 | −8.4100E−02 | −1.2792E−01 | −8.5711E−02 | −2.0363E−02 | 7.0911E−03 | 3.5331E−02 | 7.0670E−02 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R13 | −3.6506E−01 | −6.0984E−02 | 2.4152E−02 | 1.6927E−01 | 5.0741E−01 | 8.4594E−01 | 8.4641E−01 | 5.0762E−01 |
| R14 | −9.6539E−03 | −1.6020E−03 | 2.1871E−04 | 1.5311E−03 | 4.6435E−03 | 7.6650E−03 | 7.7605E−03 | 4.6016E−03 |

| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R13 | −1.8091E−01 | −5.1751E−02 | −6.4125E−03 | 1.0031E−03 | 8.9897E−03 | 3.6089E−02 | 8.4242E−02 | 1.2632E−01 |
| R14 | −4.0762E−04 | −1.3535E−04 | −1.7661E−05 | −3.3099E−09 | 4.2450E−08 | −1.1837E−07 | −5.2057E−07 | −7.1429E−06 |

| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|---|
| R13 | −8.2162E−03 | −1.4290E−02 | −1.7066E−02 | −1.4389E−02 | −8.0776E−03 | −2.9741E−03 | −6.3927E−04 | −6.7601E−05 |
| R14 | 3.340 IE−06 | 9.4261E−06 | 1.1385E−05 | 4.5008E−06 | 1.0216E−06 | 3.9695E−06 | 3.5762E−06 | 2.8583E−07 |

Figure 4:
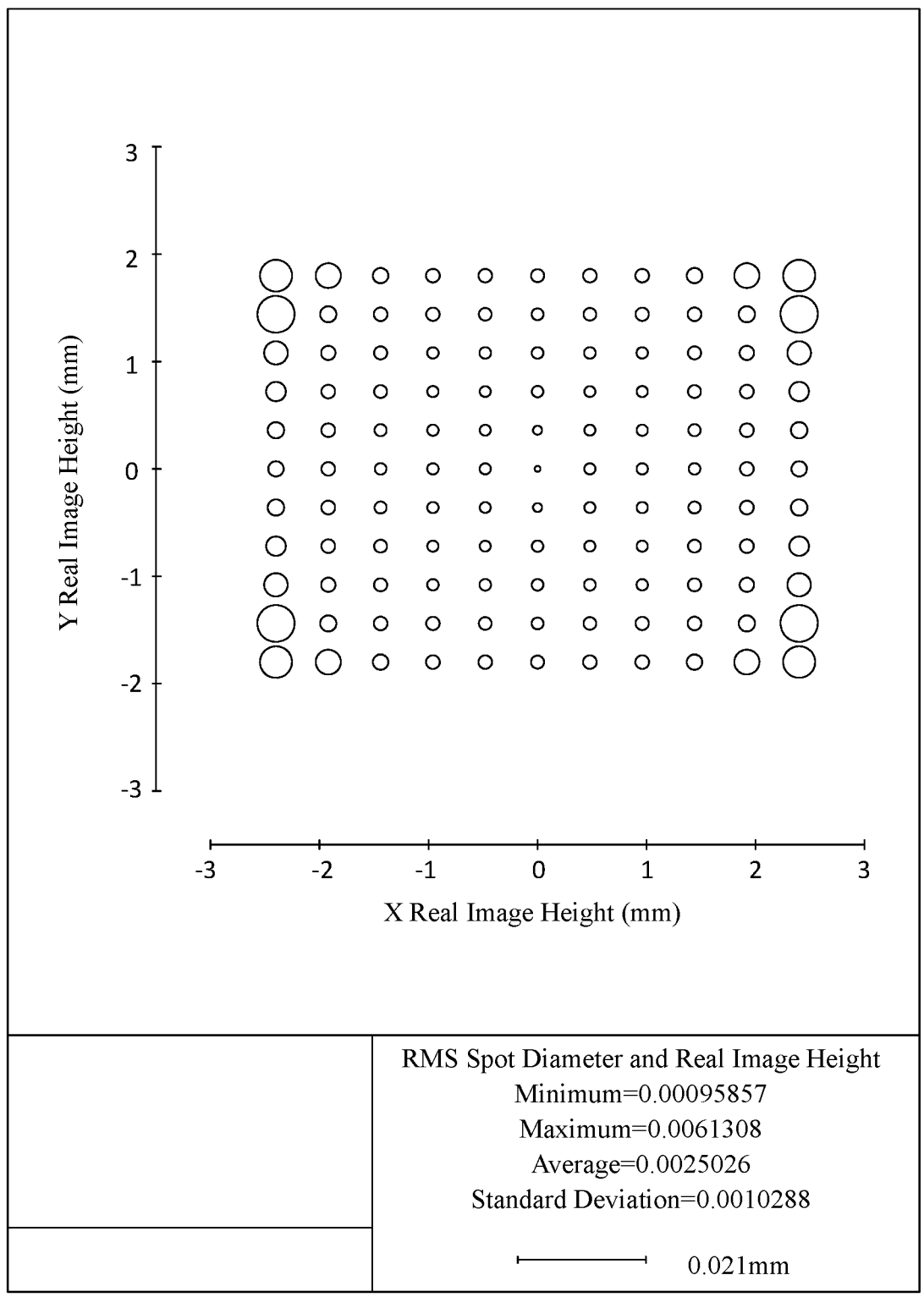
FIG. 4 is diagram showing a case where an RMS spot diameter of a camera optical lens shown in FIG. 3 is within a first quadrant.

FIG. 4 shows a situation where an RMS spot diameter of the camera optical lens 20 of Embodiment 2 is within a first quadrant. According to FIG. 4, it can be known that the camera optical lens 20 of Embodiment 2 can achieve good imaging quality.

As shown in Table 19, Embodiment 2 satisfies the respective conditions.

In this embodiment, the entrance pupil diameter ENPD of the camera optical lens is 0.934 mm. The image height (along a diagonal direction) IH is 6.000 mm, an image height in the x direction is 4.800 mm, an image height in the y direction is 3.600 mm, and the imaging effect is the best in this rectangular range. The field of view (FOV) along a diagonal direction is 121.12°, an FOV in the x direction is 107.45°, and an FOV in the y direction is 91.28°. Thus, the camera optical lens 20 satisfies design requirements of ultra-thin, large-aperture, and wide-angle while having on-axis and off-axis aberrations sufficiently corrected, thereby leading to better optical characteristics.

Embodiment 3

Embodiment 3 is basically the same as Embodiment 1 and involves symbols having the same meanings as Embodiment 1. Only differences therebetween will be described in the following.

Figure 5:
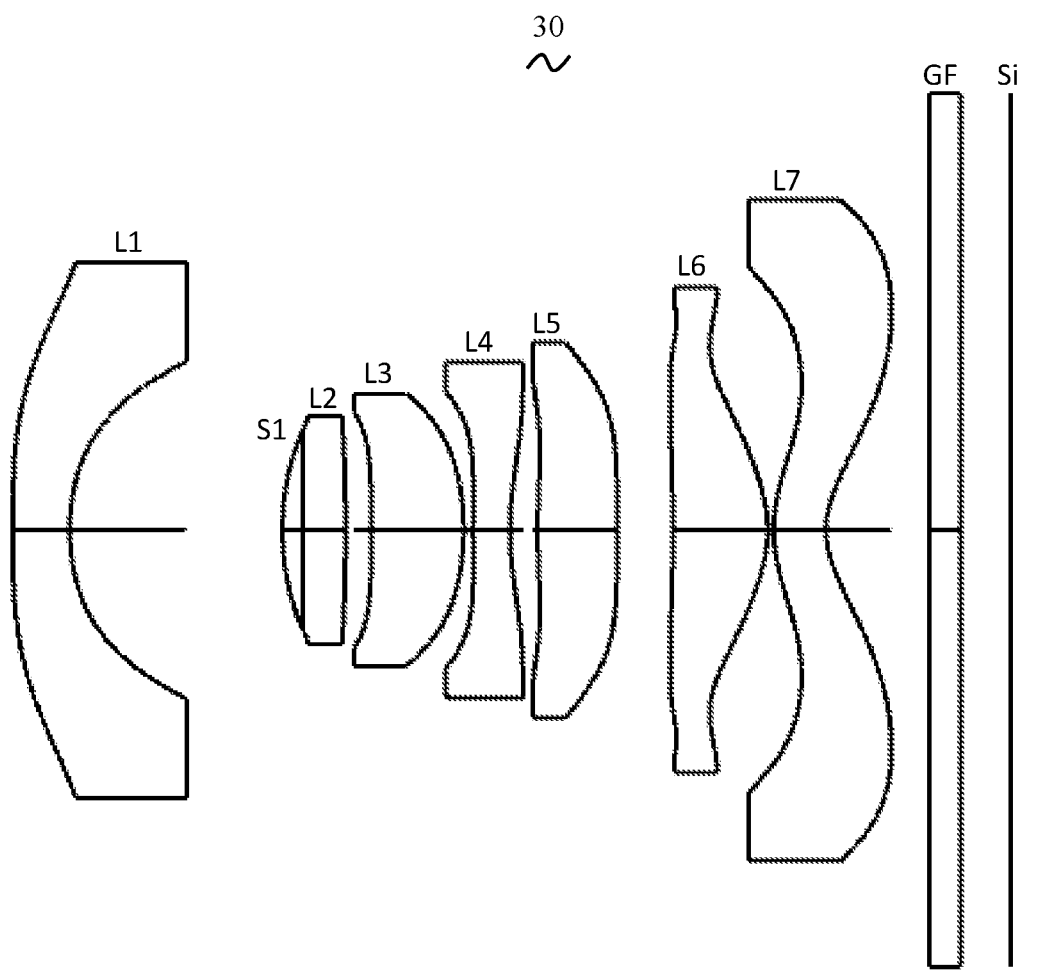
FIG. 5 is a schematic diagram of a structure of a camera optical lens in accordance with Embodiment 3 of the present disclosure.

FIG. 5 shows the camera optical lens 30 according to Embodiment 3 of the present disclosure. The camera optical lens 30 includes seven lenses. Specifically, the camera optical lens 30 includes, from an object side to an image side, a first lens L1 having a negative refractive power, an aperture S1, a second lens L2 having a positive refractive power, a third lens L3 having a positive refractive power, a fourth lens L4 having a negative refractive power, a fifth lens L5 having a positive refractive power, a sixth lens L6 having a positive refractive power, and a seventh lens L7 having a negative refractive power. An optical element such as an optical filter (GF) can be arranged between the seventh lens L7 and an image plane Si.

In this embodiment, the object-side surface of the first lens L1 is convex in the paraxial region, and the object-side surface of the fourth lens L4 is convex in the paraxial region.

Table 7 and Table 8 show design data of a camera optical lens 30 in Embodiment 3 of the present disclosure. The object-side surface and image-side surface of the first lens L1 are free-form surfaces.

TABLE 7

| | R | d | | nd | | vd |
|---|---|---|---|---|---|---|
| S1 | ∞ | d0= | −1.947 | | | |
| R1 | 34.157 | d1= | 0.384 | nd1 | 1.5444 v1 | 56.43 |
| R2 | 1.725 | d2= | 1.429 | | | |
| R3 | 2.006 | d3= | 0.424 | nd2 | 1.5510 v2 | 45.00 |
| R4 | −17.771 | d4= | 0.176 | | | |
| R5 | −13.897 | d5= | 0.619 | nd3 | 1.5444 v3 | 56.43 |
| R6 | −1.918 | d6= | 0.062 | | | |
| R7 | 21.253 | d7= | 0.250 | nd4 | 1.6800 v4 | 18.40 |
| R8 | 2.303 | d8= | 0.185 | | | |
| R9 | 4.965 | d9= | 0.535 | nd5 | 1.5444 v5 | 56.43 |
| R10 | −56.000 | d10= | 0.378 | | | |
| R11 | −5.091 | d11= | 0.635 | nd6 | 1.5444 v6 | 56.43 |
| R12 | −0.951 | d12= | 0.040 | | | |
| R13 | 1.101 | d13= | 0.350 | nd7 | 1.6800 v7 | 18.40 |
| R14 | 0.605 | d14= | 0.700 | | | |
| R15 | ∞ | d15= | 0.210 | ndg | 1.5168 vg | 64.17 |
| R16 | ∞ | d16= | 0.333 | | | |

Table 8 shows aspherical data of respective lenses in the camera optical lens 30 according to Embodiment 3 of the present disclosure.

TABLE 8

| | Conic coefficient | Aspherical coefficients | | | | |
|---|---|---|---|---|---|---|
| | k | A4 | A6 | A8 | A10 | A12 |
| R3 | 1.1741E+00 | 1.1877E−03 | 4.8432E−02 | −2.0222E−01 | 7.9541E−01 | −1.9886E+00 |
| R4 | −1.5947E+00 | −3.2568E−02 | 1.0718E−01 | −7.3976E−01 | 3.6267E+00 | −1.0668E+01 |
| R5 | 1.0000E+01 | −1.0658E−01 | −1.0540E−01 | 1.8299E−01 | −4.1671E−01 | −6.3662E−01 |

TABLE 8-continued

| | | | | | | |
|---|---|---|---|---|---|---|
| R6 | 7.1559E−01 | −4.3522E−03 | −2.4770E−01 | −1.0431E+00 | 6.9664E+00 | −1.7813E+01 |
| R7 | −1.0000E+01 | −1.3521E−01 | −1.2495E−02 | −1.4264E+00 | 5.2329E+00 | −9.0031E+00 |
| R8 | 9.1577E−01 | −2.6485E−01 | 5.1853E−01 | −1.6863E+00 | 3.5136E+00 | −4.6142E+00 |
| R9 | −7.8180E+00 | −1.9511E−01 | 5.2385E−02 | 3.0658E−01 | −8.9508E−01 | 1.1169E+00 |
| R10 | −1.0000E+01 | −1.8791E−02 | −3.5724E−01 | 6.4438E−01 | −7.4322E−01 | 5.5900E−01 |
| R11 | 5.8119E+00 | 3.0030E−01 | −5.2314E−01 | 5.6243E−01 | −4.2869E−01 | 2.6739E−01 |
| R12 | −5.4399E+00 | −4.6756E−02 | 8.8667E−02 | −1.5714E−01 | 1.5212E−01 | −4.8942E−02 |
| R13 | −2.4182E+00 | −2.9280E−01 | 2.3537E−01 | −2.7448E−01 | 2.7070E−01 | −1.7260E−01 |
| R14 | −3.5347E+00 | −8.3725E−02 | −2.1529E−02 | 4.9335E−02 | −3.0994E−02 | 1.1055E−02 |

| | Conic coefficient | Aspherical coefficients | | | |
|---|---|---|---|---|---|
| | k | A14 | A16 | A18 | A20 |
| R3 | 1.1741E+00 | 3.3206E+00 | −3.6306E+00 | 2.4198E+00 | −7.4381E−01 |
| R4 | −1.5947E+00 | 1.9529E+01 | −2.2204E+01 | 1.4589E+01 | −4.2245E+00 |
| R5 | 1.0000E+00 | 4.5725E+00 | −9.7748E+00 | 9.2965E+00 | −3.2085E+00 |
| R6 | 7.1559E−01 | 2.5417E+01 | −2.1263E+01 | 9.7349E+00 | −1.8714E+00 |
| R7 | −1.0000E+01 | 8.4042E+00 | −4.0578E+00 | 7.4792E−01 | 2.3086E−02 |
| R8 | 9.1577E−01 | 3.8804E+00 | −2.0089E+00 | 5.7724E−01 | −7.0139E−02 |
| R9 | −7.8180E+00 | −6.6925E−01 | 1.7850E−01 | −1.0169E−02 | −2.3914E−03 |
| R10 | −1.0000E+01 | −2.6712E−01 | 8.0376E−02 | −1.4844E−02 | 1.4461E−03 |
| R11 | 5.8119E+00 | −1.2731E−01 | 4.0152E−02 | −7.2767E−03 | 5.6867E−04 |
| R12 | −5.4399E+00 | −7.1846E−03 | 8.1040E−03 | −1.8172E−03 | 1.3674E−04 |
| R13 | −2.4182E+00 | 6.8513E−02 | −1.6513E−02 | 2.2170E−03 | −1.2701E−04 |
| R14 | −3.5347E+00 | −2.4721E−03 | 3.4368E−04 | −2.7305E−05 | 9.5221E−07 |

Table 9 shows free-form surface data in the camera optical lens 30 of Embodiment 3 of the present disclosure.

TABLE 9

| Free-form surface coefficients | | | | | | | |
|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R1 | 2.3216E+00 | 1.3037E−01 | 2.6169E−01 | 1.3029E−01 | −9.0381E−02 | −2.7314E−01 | −2.7223E−01 | −9.0357E−02 |
| R2 | 7.6358E−01 | 1.5431E−01 | 3.1130E−01 | 1.5419E−01 | 2.8405E−02 | 7.8753E−02 | 7.9864E−02 | 2.6929E−02 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R1 | −1.7376E−01 | −8.7175E−02 | −1.7463E−02 | 3.9830E−03 | 2.3832E−02 | 5.9351E−02 | 7.9213E−02 | 5.9816E−02 |
| R2 | 5.2853E+00 | 2.6305E+00 | 5.1865E−01 | −4.8295E−01 | −2.8728E+00 | −7.3204E+00 | −9.6911E+00 | −7.2029E+00 |

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R1 | −3.5205E−03 | −5.0837E−04 | 2.9103E−05 | 2.3279E−04 | 8.1538E−04 | 1.5793E−03 | 1.9973E−03 | 1.6910E−03 |
| R2 | 1.6721E+00 | 2.4210E−01 | −5.0295E−02 | −3.8900E−01 | −1.3898E+00 | −2.8476E+00 | −3.5221E+00 | −2.7122E+00 |

| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|---|
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R1 | 4.7398E−02 | 1.9082E−01 | 2.8573E−01 | 1.9046E−01 | 4.7524E−02 | −1.7353E−02 | −8.6917E−02 | −1.7360E−01 |
| R2 | −2.9320E−01 | −1.1748E+00 | −1.7645E+00 | −1.1644E+00 | −2.8602E−01 | 5.2746E−01 | 2.6426E+00 | 5.3260E+00 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R1 | 2.3842E−02 | 3.9984E−03 | −5.1868E−04 | −3.6160E−03 | −1.0793E−02 | −1.7790E−02 | −1.8198E−02 | −1.0874E−02 |
| R2 | −2.9137E+00 | −4.8426E−01 | 2.3408E−01 | 1.6013E+00 | 4.9256E+00 | 8.2825E+00 | 8.0756E+00 | 4.8608E+00 |

| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R1 | 7.9003E−04 | 2.0953E−04 | 2.6396E−05 | 0.0000E+00 | 0.0000E+00 | 0.0000E+00 | 0.0000E+00 | 0.0000E+00 |
| R2 | −1.4014E+00 | −4.1759E−01 | −5.3827E−02 | 0.0000E+00 | 0.0000E+00 | 0.0000E+00 | 0.0000E+00 | 0.0000E+00 |

| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|---|
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |

Figure 6:
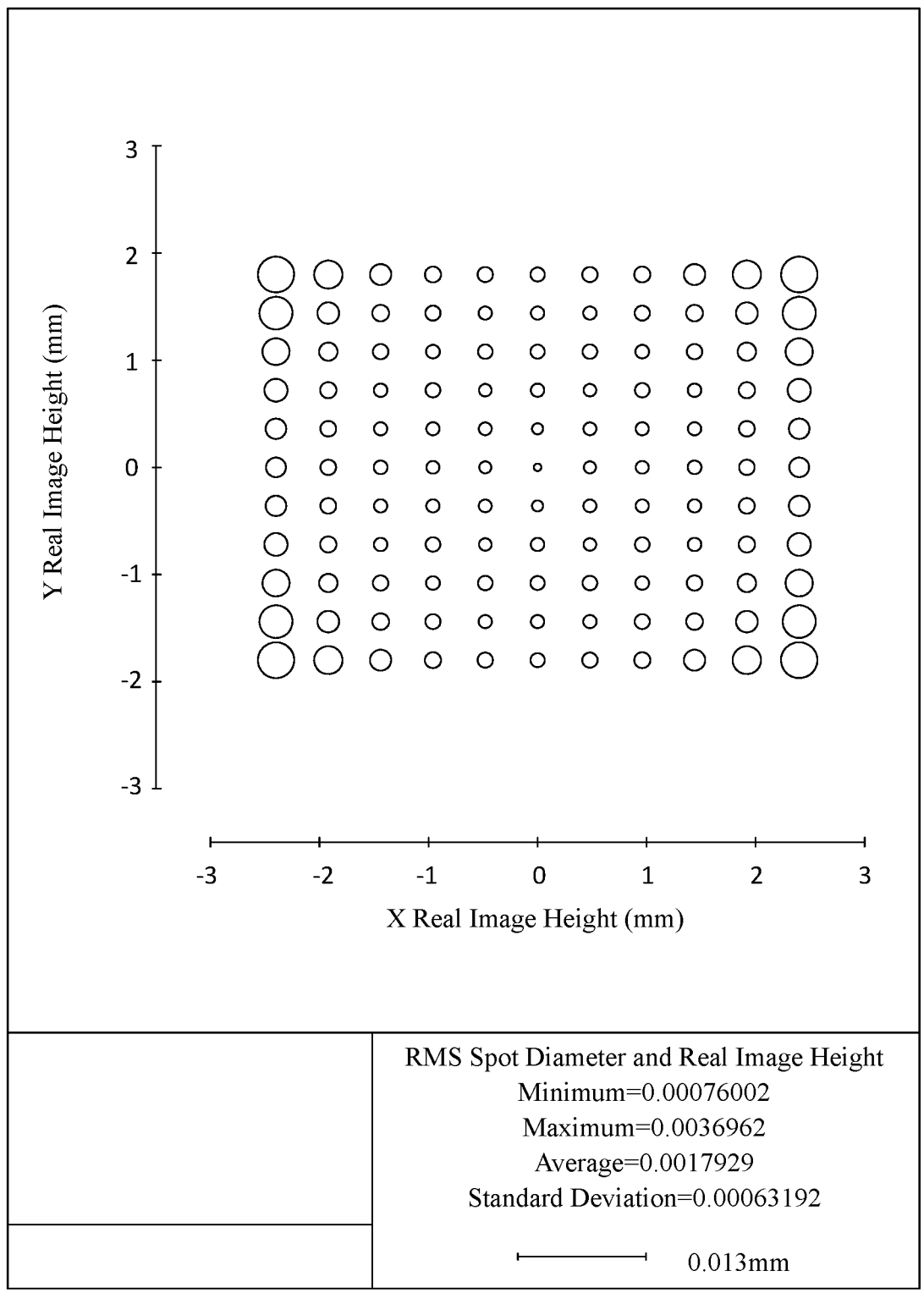
FIG. 6 is diagram showing a case where an RMS spot diameter of a camera optical lens shown in FIG. 5 is within a first quadrant.

FIG. 6 shows a situation where an RMS spot diameter of the camera optical lens 30 of Embodiment 3 is within a first quadrant. According to FIG. 6, it can be known that the camera optical lens 30 of Embodiment 3 can achieve good imaging quality.

Table 19 below further lists values corresponding to various conditions in this embodiment according to the above conditions. Obviously, the camera optical lens according to this embodiment satisfies the above conditions.

In this embodiment, the entrance pupil diameter ENPD of the camera optical lens is 0.982 mm. The image height (along a diagonal direction) IH is 6.000 mm, an image height in the x direction is 4.800 mm, an image height in the y direction is 3.600 mm, and the imaging effect is the best in this rectangular range. The field of view (FOV) along a diagonal direction is 121.23°, an FOV in the x direction is 105.39°, and an FOV in the y direction is 88.34°. Thus, the camera optical lens 30 satisfies design requirements of ultra-thin, large-aperture, and wide-angle while having on-axis and off-axis aberrations sufficiently corrected, thereby leading to better optical characteristics.

Embodiment 4

Embodiment 4 is basically the same as Embodiment 1 and involves symbols having the same meanings as Embodiment 1. Only differences therebetween will be described in the following.

Figure 7:
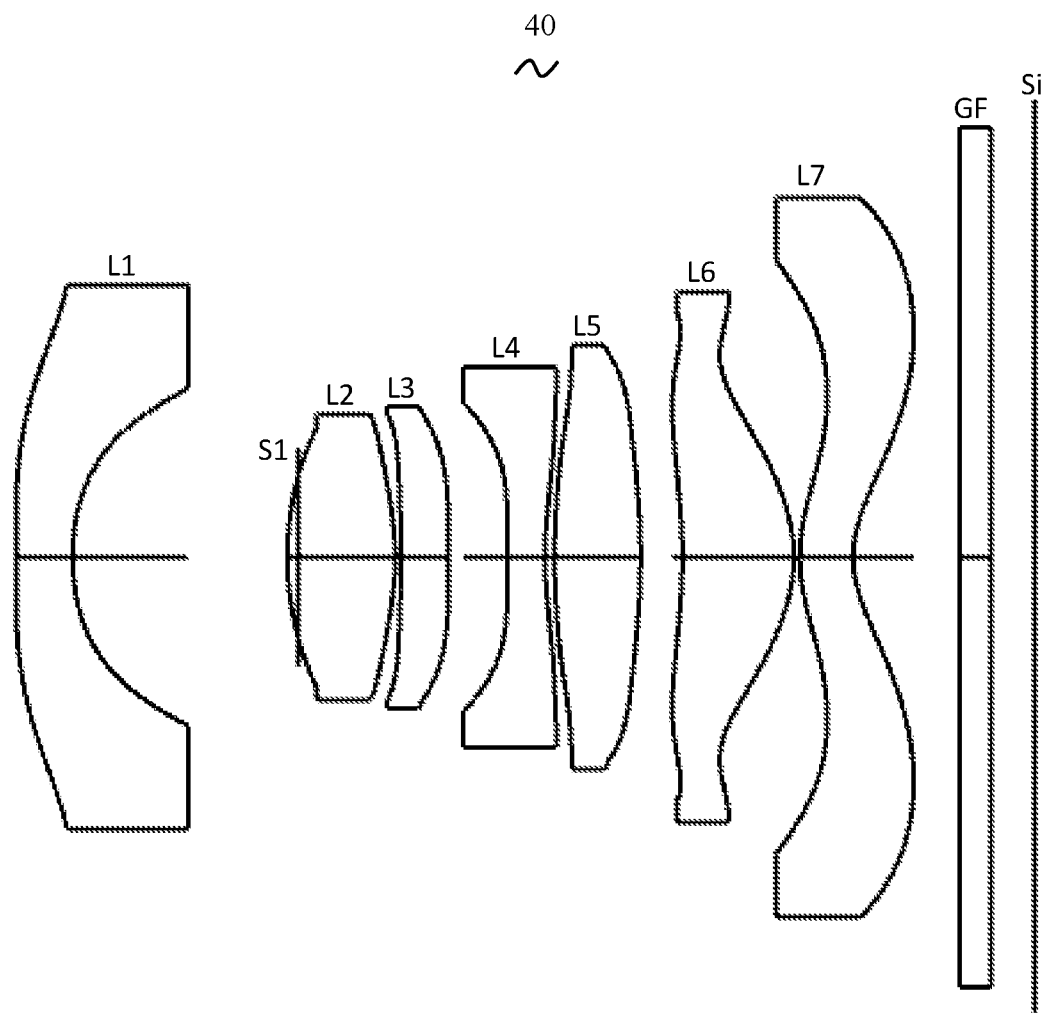
FIG. 7 is a schematic diagram of a structure of a camera optical lens in accordance with Embodiment 4 of the present disclosure.

FIG. 7 shows the camera optical lens 40 according to Embodiment 4 of the present disclosure. The camera optical lens 40 includes seven lenses. Specifically, the camera optical lens 40 includes, from an object side to an image side, a first lens L1 having a negative refractive power, an aperture S1, a second lens L2 having a positive refractive power, a third lens L3 having a negative refractive power, a fourth lens L4 having a negative refractive power, a fifth lens L5 having a positive refractive power, a sixth lens L6 having a positive refractive power, and a seventh lens L7 having a negative refractive power. An optical element such as an optical filter (GF) can be arranged between the seventh lens L7 and an image plane Si.

In this embodiment, the third lens L3 has a negative refractive power, and the object-side surface of the fourth lens L4 is convex in the paraxial region.

Table 10 and Table 11 show design data of a camera optical lens 40 in Embodiment 4 of the present disclosure. The object-side surface and image-side surface of the first lens L1 are free-form surfaces.

TABLE 10

| | R | d | | nd | | vd |
|---|---|---|---|---|---|---|
| S1 | ∞ | d0= | −1.855 | | | |
| R1 | −108.885 | d1= | 0.375 | nd1 | 1.5444 v1 | 56.43 |
| R2 | 1.587 | d2= | 1.413 | | | |
| R3 | 2.112 | d3= | 0.709 | nd2 | 1.5444 v2 | 56.43 |
| R4 | −1.629 | d4= | 0.040 | | | |
| R5 | −4.436 | d5= | 0.311 | nd3 | 1.5660 v3 | 37.70 |
| R6 | −38.350 | d6= | 0.384 | | | |
| R7 | 13.902 | d7= | 0.250 | nd4 | 1.6800 v4 | 18.40 |
| R8 | 2.280 | d8= | 0.065 | | | |
| R9 | 4.391 | d9= | 0.565 | nd5 | 1.5444 v5 | 56.43 |
| R10 | −4.583 | d10= | 0.275 | | | |
| R11 | −3.270 | d11= | 0.733 | nd6 | 1.5444 v6 | 56.43 |
| R12 | −1.034 | d12= | 0.040 | | | |
| R13 | 1.133 | d13= | 0.350 | nd7 | 1.6800 v7 | 18.40 |
| R14 | 0.689 | d14= | 0.700 | | | |
| R15 | ∞ | d15= | 0.210 | ndg | 1.5168 vg | 64.17 |
| R16 | ∞ | d16= | 0.290 | | | |

Table 11 shows aspherical data of respective lenses in the camera optical lens 40 according to Embodiment 4 of the present disclosure.

TABLE 11

| | Conic coefficient | Aspherical coefficients | | | | |
|---|---|---|---|---|---|---|
| | k | A4 | A6 | A8 | A10 | A12 |
| R3 | 9.2529E−02 | 1.2064E−02 | 1.2192E−01 | −9.3745E−01 | 4.4100E+00 | −1.2599E+01 |
| R4 | −9.9802E+00 | 4.1828E−01 | −2.4504E+00 | 1.0021E+01 | −2.9263E+01 | 5.9723E+01 |
| R5 | −1.0000E+01 | 5.6960E−01 | −3.0291E+00 | 1.1428E+01 | −3.1951E+01 | 6.2241E+01 |
| R6 | 1.0000E+01 | −2.0580E−01 | −7.1640E−02 | 2.1370E−01 | −1.2994E−01 | −5.1935E−01 |
| R7 | −1.0000E+01 | −4.2236E−01 | 3.5270E−01 | −1.4210E+00 | 3.3066E+00 | −3.9780E+00 |
| R8 | 8.1312E−01 | −4.6387E−01 | 1.0783E+00 | −2.5105E+00 | 4.1256E+00 | −4.4836E+00 |
| R9 | 3.9158E+00 | −2.4030E−01 | 9.1982E−01 | −1.9132E+00 | 2.4618E+00 | −2.1127E+00 |
| R10 | −2.9880E+00 | 2.3256E−02 | 5.8737E−02 | −2.2202E−01 | 4.8734E−01 | −6.3357E−01 |
| R11 | 4.2650E−01 | 1.8112E−01 | −2.3417E−01 | 2.4580E−01 | −1.1535E−01 | −5.3337E−04 |
| R12 | −3.6635E+00 | −9.3692E−02 | 3.7181E−02 | 6.9696E−02 | −1.5283E−01 | 1.7872E−01 |
| R13 | −2.1462E+00 | −3.1097E−01 | 1.7302E−01 | −9.7515E−02 | 8.4422E−02 | −6.3100E−02 |
| R14 | −2.9220E+00 | −1.8267E−01 | 8.1181E−02 | −1.0213E−02 | −9.0149E−03 | 5.3225E−03 |

| | Conic coefficient | Aspherical coefficients | | | |
|---|---|---|---|---|---|
| | k | A14 | A16 | A18 | A20 |
| R3 | 9.2529E−02 | 2.2308E+01 | −2.4156E+01 | 1.4725E+01 | −3.9102E+00 |
| R4 | −9.9802E+00 | −8.2166E+01 | 7.1760E+01 | −3.5689E+01 | 7.6381E+00 |
| R5 | −1.0000E+01 | −8.1148E+01 | 6.6532E+01 | −3.0745E+01 | 6.0847E+00 |
| R6 | 1.0000E+01 | 1.6807E+00 | −2.3182E+00 | 1.5564E+00 | −3.9407E−01 |
| R7 | −1.0000E+01 | 2.8024E+00 | −1.2133E+00 | 3.0070E−01 | −3.3557E−02 |
| R8 | 8.1312E−01 | 3.1826E+00 | −1.4251E+00 | 3.6590E−01 | −4.1236E−02 |
| R9 | 3.9158E+00 | 1.2154E+00 | −4.5797E−01 | 1.0483E−01 | −1.1290E−02 |
| R10 | −2.9880E+00 | 4.6509E−01 | −1.9378E−01 | 4.2458E−02 | −3.6628E−03 |
| R11 | 4.2650E−01 | 2.6449E−02 | −1.2737E−02 | 2.6342E−03 | −2.1407E−04 |

TABLE 11-continued

| | | | | | |
|---|---|---|---|---|---|
| R12 | −3.6635E+00 | −1.0846E−01 | 3.4716E−02 | −5.6337E−03 | 3.6690E−04 |
| R13 | −2.1462E+00 | 2.8829E−02 | −7.5946E−03 | 1.0716E−03 | −6.2928E−05 |
| R14 | −2.9220E+00 | −1.3385E−03 | 1.7954E−04 | −1.2412E−05 | 3.4366E−07 |

Table 12 shows free-form surface data in the camera optical lens 40 of Embodiment 4 of the present disclosure.

TABLE 12

| Free-form surface coefficients | | | | | | | |
|---|---|---|---|---|---|---|---|
| k | $X^4Y^0$ | $X^2Y^2$ | $X^0Y^4$ | $X^6Y^0$ | $X^4Y^2$ | $X^2Y^4$ | $X^0Y^6$ |
| R1 8.5514E+00 | 1.8425E−01 | 3.6799E−01 | 1.8448E−01 | −1.7820E−01 | −5.3495E−01 | −5.3422E−01 | −1.7804E−01 |
| R2 6.3621E−01 | 2.3120E−01 | 4.6297E−01 | 2.3190E−01 | −9.8597E−03 | −3.4295E−02 | −3.9723E−02 | −9.8636E−03 |
| $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R1 −9.3082E−01 | −4.6544E−01 | −9.3050E−02 | 4.2350E−02 | 2.5406E−01 | 6.3522E−01 | 8.4689E−01 | 6.3526E−01 |
| R2 1.7200E+01 | 8.5905E+00 | 1.7268E+00 | −2.8286E+00 | −1.6957E+01 | −4.2411E+01 | −5.6490E+01 | −4.2385E+01 |
| $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R1 −9.2760E−02 | −1.3240E−02 | 2.6871E−03 | 2.1499E−02 | 7.5263E−02 | 1.5050E−01 | 1.8812E−01 | 1.5053E−01 |
| R2 1.9353E+01 | 2.7661E+00 | −1.5981E+00 | −1.2809E+01 | −4.4832E+01 | −8.9633E+01 | −1.1214E+02 | −8.9400E+01 |
| $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R1 −3.9881E−02 | −2.6638E−02 | −1.1411E−02 | −2.8324E−03 | −3.1698E−04 | 1.6391E−05 | 1.6493E−04 | 7.3819E−04 |
| R2 6.1210E+01 | 4.0734E+01 | 1.7535E+01 | 4.4492E+00 | 4.9908E−01 | −6.0883E−02 | −6.1045E−01 | −2.7557E+00 |
| $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R1 1.4621E−01 | 5.8551E−01 | 8.7726E−01 | 5.8475E−01 | 1.4591E−01 | −9.3094E−02 | −4.6563E−01 | −9.3109E−01 |
| R2 −5.4184E−01 | −2.1631E+00 | −3.2303E+00 | −2.1333E+00 | −5.4254E−01 | 1.7258E+00 | 8.6236E+00 | 1.7228E+01 |
| $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R1 2.5413E−01 | 4.2383E−02 | −1.3246E−02 | −9.2699E−02 | −2.7817E−01 | −4.6355E−01 | −4.6367E−01 | −2.7813E−01 |
| R2 −1.6965E+01 | −2.8329E+00 | 2.7650E+00 | 1.9361E+01 | 5.8102E+01 | 9.6844E+01 | 9.6736E+01 | 5.8085E+01 |
| $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R1 7.5228E−02 | 2.1488E−02 | 2.6823E−03 | −3.1667E−04 | −2.8550E−03 | −1.1408E−02 | −2.6616E−02 | −3.9991E−02 |
| R2 −4.4740E+01 | −1.2792E+01 | −1.5975E+00 | 4.8742E−01 | 4.3973E+00 | 1.7598E+01 | 4.0860E+01 | 6.1742E+01 |
| $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R1 1.9755E−03 | 3.4516E−03 | 4.1470E−03 | 3.4536E−03 | 1.9693E−03 | 7.4078E−04 | 1.5902E−04 | 1.6330E−05 |
| R2 −7.0878E+00 | −1.3173E+01 | −1.4859E+01 | −1.2695E+01 | −7.1516E+00 | −2.7818E+00 | −6.5857E−01 | −7.0797E−02 |

Figure 8:
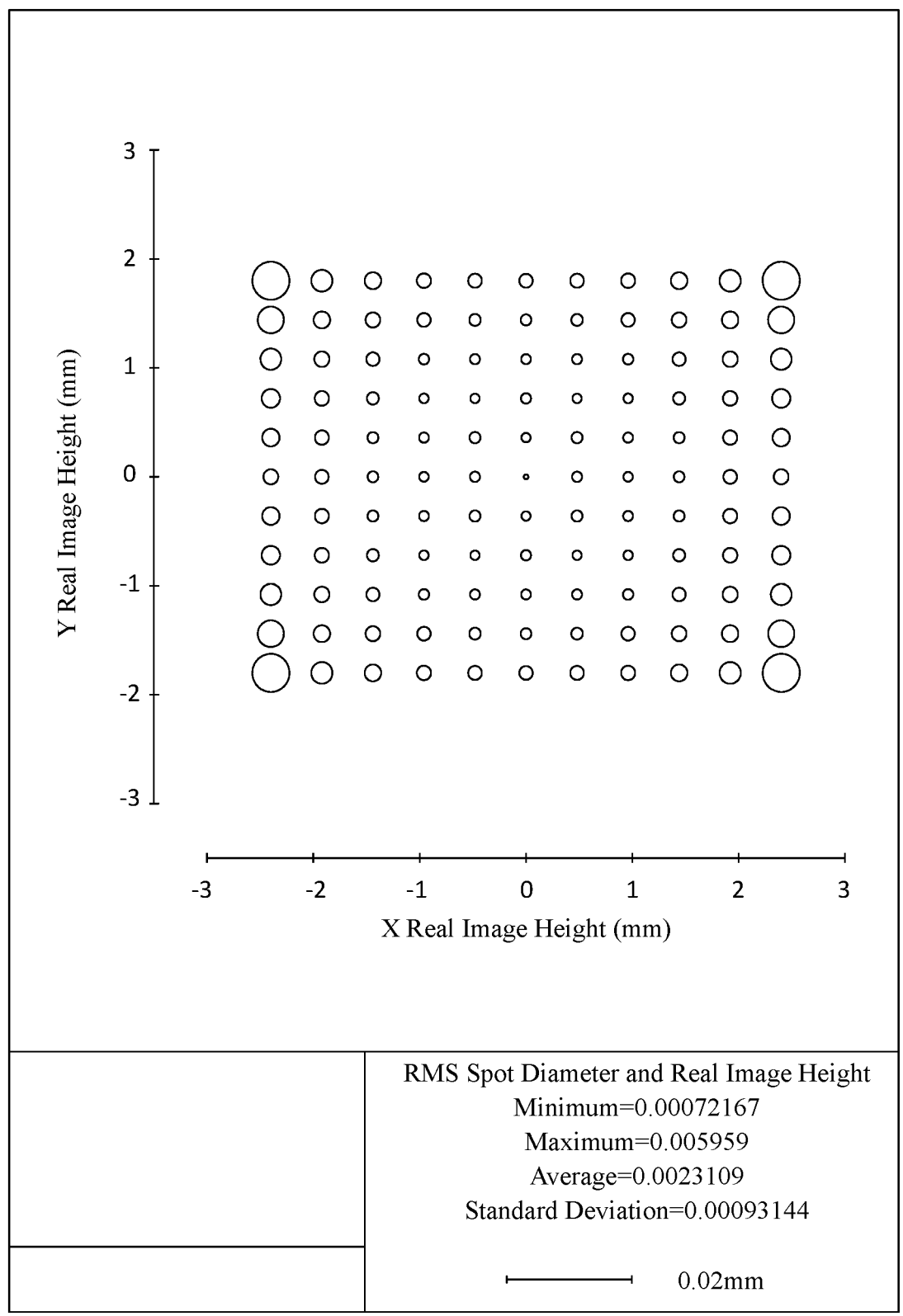
FIG. 8 is diagram showing a case where an RMS spot diameter of a camera optical lens shown in FIG. 7 is within a first quadrant.

FIG. 8 shows a situation where an RMS spot diameter of the camera optical lens 40 of Embodiment 4 is within a first quadrant. According to FIG. 8, it can be known that the camera optical lens 40 of Embodiment 4 can achieve good imaging quality.

Table 19 below further lists values corresponding to various conditions in this embodiment according to the above conditions. Obviously, the camera optical lens according to this embodiment satisfies the above conditions.

In this embodiment, the entrance pupil diameter ENPD of the camera optical lens is 0.952 mm. The image height (along a diagonal direction) IH is 6.000 mm, an image height in the x direction is 4.800 mm, an image height in the y direction is 3.600 mm, and the imaging effect is the best in this rectangular range. The field of view (FOV) along a diagonal direction is 121.17°, an FOV in the x direction is 106.54°, and an FOV in the y direction is 90.09°. Thus, the camera optical lens 40 satisfies design requirements of ultra-thin, large-aperture, and wide-angle while having on-axis and off-axis aberrations sufficiently corrected, thereby leading to better optical characteristics.

Embodiment 5

Embodiment 5 is basically the same as Embodiment 1 and involves symbols having the same meanings as Embodiment 1. Only differences therebetween will be described in the following.

Figure 9:
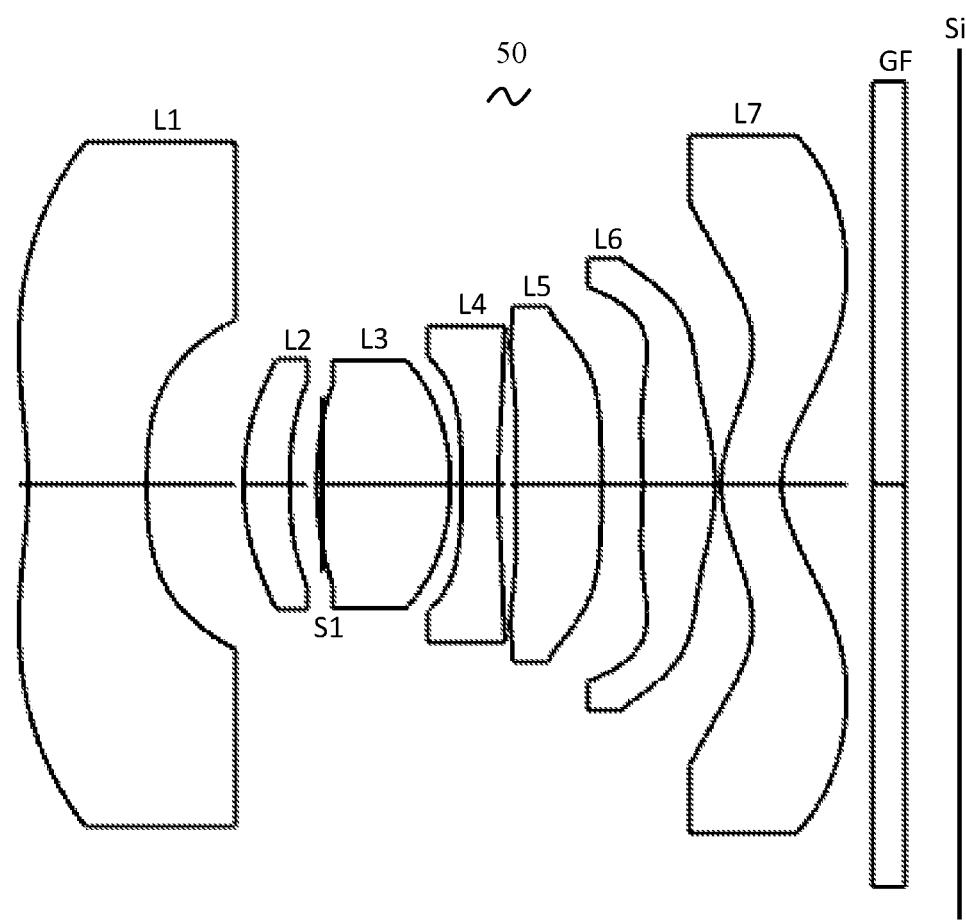
FIG. 9 is a schematic diagram of a structure of a camera optical lens in accordance with Embodiment 5 of the present disclosure.

FIG. 9 shows the camera optical lens 50 according to Embodiment 5 of the present disclosure. The camera optical lens 50 includes seven lenses. Specifically, the camera optical lens 50 includes, from an object side to an image side, a first lens L1 having a negative refractive power, a second lens L2 having a positive refractive power, an aperture S1, a third lens L3 having a positive refractive power, a fourth lens L4 having a negative refractive power, a fifth lens L5 having a positive refractive power, a sixth lens L6 having a positive refractive power, and a seventh lens L7 having a negative refractive power. An optical element such as an optical filter (GF) can be arranged between the seventh lens L7 and an image plane Si.

In this embodiment, the image-side surface of the second lens L2 is concave in the paraxial region, and the object-side surface of the third lens L3 is convex in the paraxial region.

Table 13 and Table 14 show design data of a camera optical lens 50 in Embodiment 5 of the present disclosure.

TABLE 13

|  | R | d |  | nd | vd |
|---|---|---|---|---|---|
| S1 | ∞ | d0= | −1.929 |  |  |
| R1 | −2.790 | d1= | 0.776 | nd1 1.5444 | v1 56.43 |
| R2 | 4.466 | d2= | 0.635 |  |  |
| R3 | 1.980 | d3= | 0.300 | nd2 1.6610 | v2 20.53 |
| R4 | 3.242 | d4= | 0.180 |  |  |
| R5 | 2.937 | d5= | 0.874 | nd3 1.5444 | v3 56.43 |
| R6 | −1.599 | d6= | 0.075 |  |  |

TABLE 13-continued

|  | R | d |  | nd | vd |
|---|---|---|---|---|---|
| R7 | −5.237 | d7= | 0.240 | nd4 1.6800 | v4 18.40 |
| R8 | 6.630 | d8= | 0.114 |  |  |
| R9 | 18.003 | d9= | 0.561 | nd5 1.5444 | v5 56.43 |
| R10 | −9.993 | d10= | 0.270 |  |  |
| R11 | −3.638 | d11= | 0.473 | nd6 1.5444 | v6 56.43 |
| R12 | −1.486 | d12= | 0.040 |  |  |
| R13 | 0.917 | d13= | 0.395 | nd7 1.6032 | v7 28.29 |
| R14 | 0.677 | d14= | 0.600 |  |  |
| R15 | ∞ | d15= | 0.210 | ndg 1.5168 | vg 64.17 |
| R16 | ∞ | d16= | 0.357 |  |  |

Table 14 shows aspherical data of respective lenses in the camera optical lens 50 according to Embodiment 5 of the present disclosure.

TABLE 14

| | Conic coefficient | Aspherical coefficients | | | | |
|---|---|---|---|---|---|---|
| | k | A4 | A6 | A8 | A10 | A12 |
| R1 | −2.5000E+01 | 8.7697E−02 | −4.4901E−02 | 1.9327E−02 | −6.1247E−03 | 1.3382E−03 |
| R2 | −8.3555E+00 | 3.5609E−01 | −2.6630E−01 | 4.6958E−01 | −8.2653E−01 | 1.2945E+00 |
| R3 | −5.9846E+00 | 2.2401E−01 | −2.5014E−01 | 8.8564E−01 | −3.4052E+00 | 6.9574E+00 |
| R4 | 5.6262E+00 | 1.8052E−01 | 1.0781E−02 | −7.1662E−01 | 2.3988E+00 | −4.8369E+00 |
| R5 | −1.0817E+00 | 1.1627E−01 | 6.1206E−02 | −9.3023E−01 | 4.5533E+00 | −1.4847E+01 |
| R6 | 6.0160E−01 | 1.2389E−01 | −1.4635E+00 | 7.9503E+00 | −3.1167E+01 | 8.1960E+01 |
| R7 | 1.0000E+01 | 9.4441E−02 | −1.6653E+00 | 7.1692E+00 | −2.3984E+01 | 5.1837E+01 |
| R8 | 9.9147E+00 | 2.6000E−02 | −6.7212E−01 | 2.8539E+00 | −7.3038E+00 | 1.1595E+01 |
| R9 | −4.7177E+00 | −1.2014E−01 | −3.3501E−01 | 1.2121E+00 | −9.2028E−01 | −1.9063E+00 |
| R10 | 1.0000E+01 | 2.3012E−02 | −2.8230E−01 | −5.2264E−01 | 2.4122E+00 | −4.2170E+00 |
| R11 | 3.0710E+00 | 6.5983E−01 | −1.1009E+00 | 1.5044E+00 | −1.8907E+00 | 1.7884E+00 |
| R12 | −2.7848E−01 | 2.8557E−01 | −1.9872E−02 | 2.4163E−01 | −8.5926E−01 | 1.0070E+00 |

| | Conic coefficient | Aspherical coefficients | | | |
|---|---|---|---|---|---|
| | k | A14 | A16 | A18 | A20 |
| R1 | −2.5000E+01 | −1.8759E−04 | 1.5164E−05 | −5.4361E−07 | 6.8889E−10 |
| R2 | −8.3555E+00 | −1.4089E+00 | 9.1592E−01 | −3.0195E−01 | 3.5124E−02 |
| R3 | −5.9846E+00 | −7.7213E+00 | 2.8944E+00 | 1.9734E+00 | −1.5097E+00 |
| R4 | 5.6262E+00 | 4.0916E+00 | 0.0000E+00 | 0.0000E+00 | 0.0000E+00 |
| R5 | −1.0817E+00 | 3.1337E+01 | −4.0408E+01 | 2.8555E+01 | −8.4183E+00 |
| R6 | 6.0160E−01 | −1.3785E+02 | 1.4167E+02 | −8.0879E+01 | 1.9630E+01 |
| R7 | 1.0000E+01 | −6.9467E+01 | 5.5285E+01 | −2.3941E+01 | 4.4433E+00 |
| R8 | 9.9147E+00 | −1.1326E+01 | 6.6372E+00 | −2.1466E+00 | 2.9442E−01 |
| R9 | −4.7177E+00 | 5.0345E+00 | −4.8185E+00 | 2.1812E+00 | −3.9002E−01 |
| R10 | 1.0000E+01 | 4.3663E+00 | −2.7601E+00 | 9.8132E−01 | −1.4904E−01 |
| R11 | 3.0710E+00 | −1.2151E+00 | 5.6303E−01 | −1.5929E−01 | 2.0505E−02 |
| R12 | −2.7848E−01 | −6.1658E−01 | 2.1366E−01 | −3.9715E−02 | 3.0936E−03 |

Table 15 shows free-form surface data in the camera optical lens 50 of Embodiment 5 of the present disclosure.

TABLE 15

| | Free-form surface coefficients | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R13 | −2.3536E+00 | −3.0761E−01 | −6.1567E−01 | −3.0804E−01 | 1.7093E−01 | 5.1268E−01 | 5.1423E−01 | 1.7208E−01 |
| R14 | −2.3515E+00 | −2.3485E−01 | −4.6950E−01 | −2.3500E−01 | 1.5303E−01 | 4.5823E−01 | 4.5962E−01 | 1.5369E−01 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R13 | 5.6676E−01 | 2.8432E−01 | 5.6668E−02 | −8.2451E−03 | −4.9529E−02 | −1.2364E−01 | −1.6546E−01 | −1.2324E−01 |
| R14 | 3.7226E−01 | 1.8623E−01 | 3.7243E−02 | −1.1535E−02 | −6.9224E−02 | −1.7302E−01 | −2.3082E−01 | −1.7295E−01 |

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R13 | −1.8158E−02 | −2.4924E−03 | 1.1651E−03 | 9.3280E−03 | 3.2645E−02 | 6.5322E−02 | 8.1691E−02 | 6.5194E−02 |
| R14 | 1.6610E−02 | 2.3767E−03 | −3.0524E−04 | −2.4414E−03 | −8.5437E−03 | −1.7081E−02 | −2.1366E−02 | −1.7081E−02 |

TABLE 15-continued

| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|---|
| R13 | −2.0636E−02 | −1.3849E−02 | −5.9330E−03 | −1.4505E−03 | −1.8509E−04 | 8.1524E−06 | 8.1193E−05 | 3.6401E−04 |
| R14 | 2.7762E−03 | 1.8526E−03 | 7.9155E−04 | 1.9801E−04 | 2.2256E−05 | −6.7795E−07 | −6.8167E−06 | −3.0602E−05 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R13 | −1.2268E−01 | −4.9061E−01 | −7.3517E−01 | −4.9230E−01 | −1.2346E−01 | 5.6735E−02 | 2.8383E−01 | 5.6696E−01 |
| R14 | −8.5257E−02 | −3.4051E−01 | −5.1108E−01 | −3.4135E−01 | −8.5660E−02 | 3.7233E−02 | 1.8611E−01 | 3.7216E−01 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R13 | −4.9420E−02 | −8.1442E−03 | −2.5780E−03 | −1.8048E−02 | −5.4133E−02 | −9.0211E−02 | −9.0153E−02 | −5.4003E−02 |
| R14 | −6.9233E−02 | −1.1488E−02 | 2.3740E−03 | 1.6618E−02 | 4.9849E−02 | 8.3100E−02 | 8.3077E−02 | 4.9864E−02 |

| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R13 | 3.2667E−02 | 9.2395E−03 | 1.1495E−03 | −1.6404E−04 | −1.4760E−03 | −5.9102E−03 | −1.3764E−02 | −2.0645E−02 |
| R14 | −8.5472E−03 | −2.4413E−03 | −3.1032E−04 | 2.2035E−05 | 1.9852E−04 | 7.9332E−04 | 1.8520E−03 | 2.7780E−03 |

| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|---|
| R13 | 9.7789E−04 | 1.6845E−03 | 2.0181E−03 | 1.7333E−03 | 9.9927E−04 | 3.3437E−04 | 1.0269E−04 | 1.2458E−05 |
| R14 | −8.1792E−05 | −1.4307E−04 | −1.7140E−04 | −1.4285E−04 | −8.1171E−05 | −3.1642E−05 | −5.9166E−06 | −6.1864E−07 |

Figure 10:
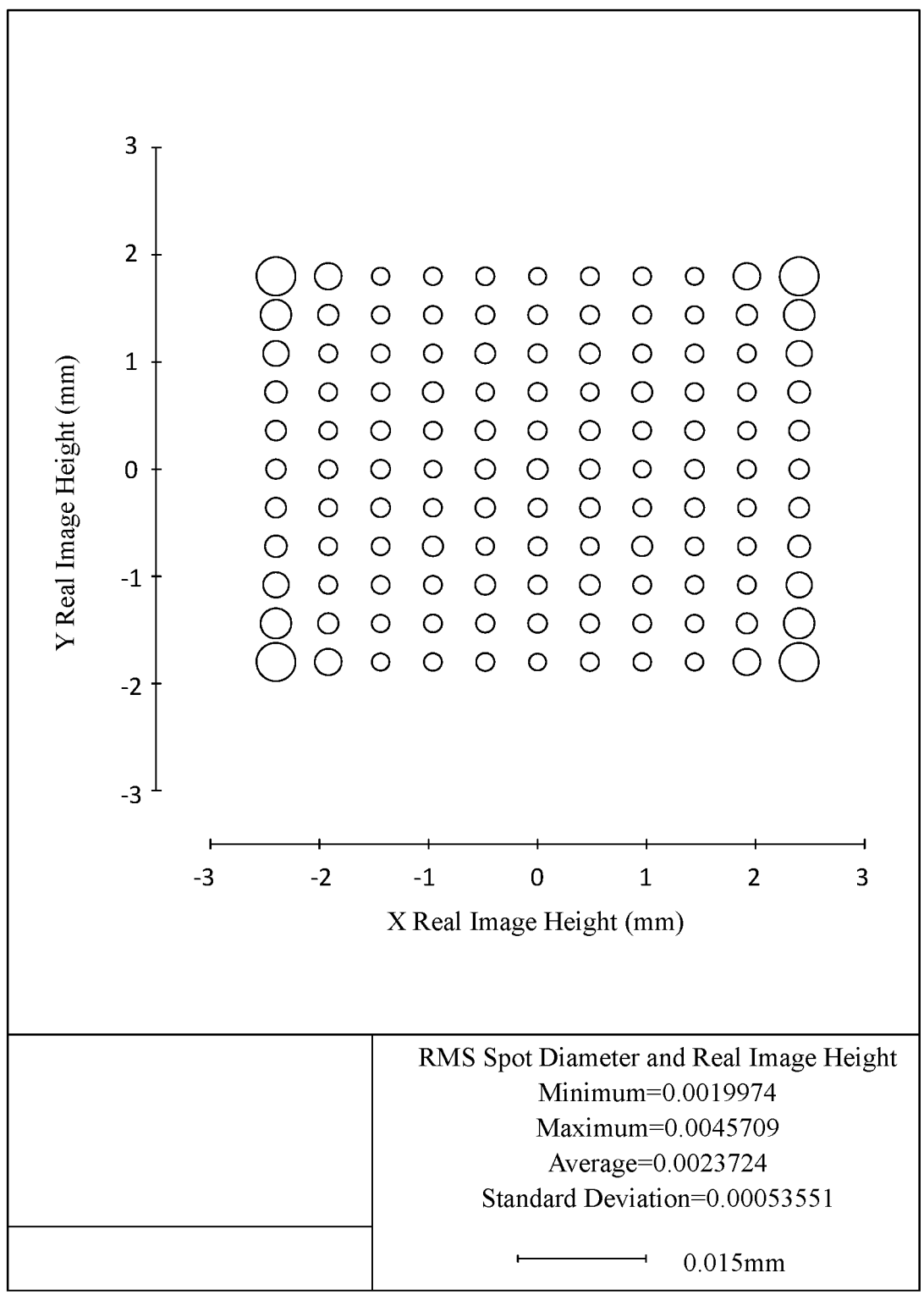
FIG. 10 is diagram showing a case where an RMS spot diameter of a camera optical lens shown in FIG. 9 is within a first quadrant.

FIG. 10 shows a situation where an RMS spot diameter of the camera optical lens 50 of Embodiment 5 is within a first quadrant. According to FIG. 10, it can be known that the camera optical lens 50 of Embodiment 5 can achieve good imaging quality.

Table 19 below further lists values corresponding to various conditions in this embodiment according to the above conditions. Obviously, the camera optical lens according to this embodiment satisfies the above conditions.

In this embodiment, the entrance pupil diameter ENPD of the camera optical lens is 0.923 mm. The image height (along a diagonal direction) IH is 6.000 mm, an image height in the x direction is 4.800 mm, an image height in the y direction is 3.600 mm, and the imaging effect is the best in this rectangular range. The field of view (FOV) along a diagonal direction is 120.00°, an FOV in the x direction is 107.37°, and an FOV in the y direction is 89.43°. Thus, the camera optical lens 50 satisfies design requirements of ultra-thin, large-aperture, and wide-angle while having on-axis and off-axis aberrations sufficiently corrected, thereby leading to better optical characteristics.

Embodiment 6

Embodiment 6 is basically the same as Embodiment 1 and involves symbols having the same meanings as Embodiment 1. Only differences therebetween will be described in the following.

Figure 11:
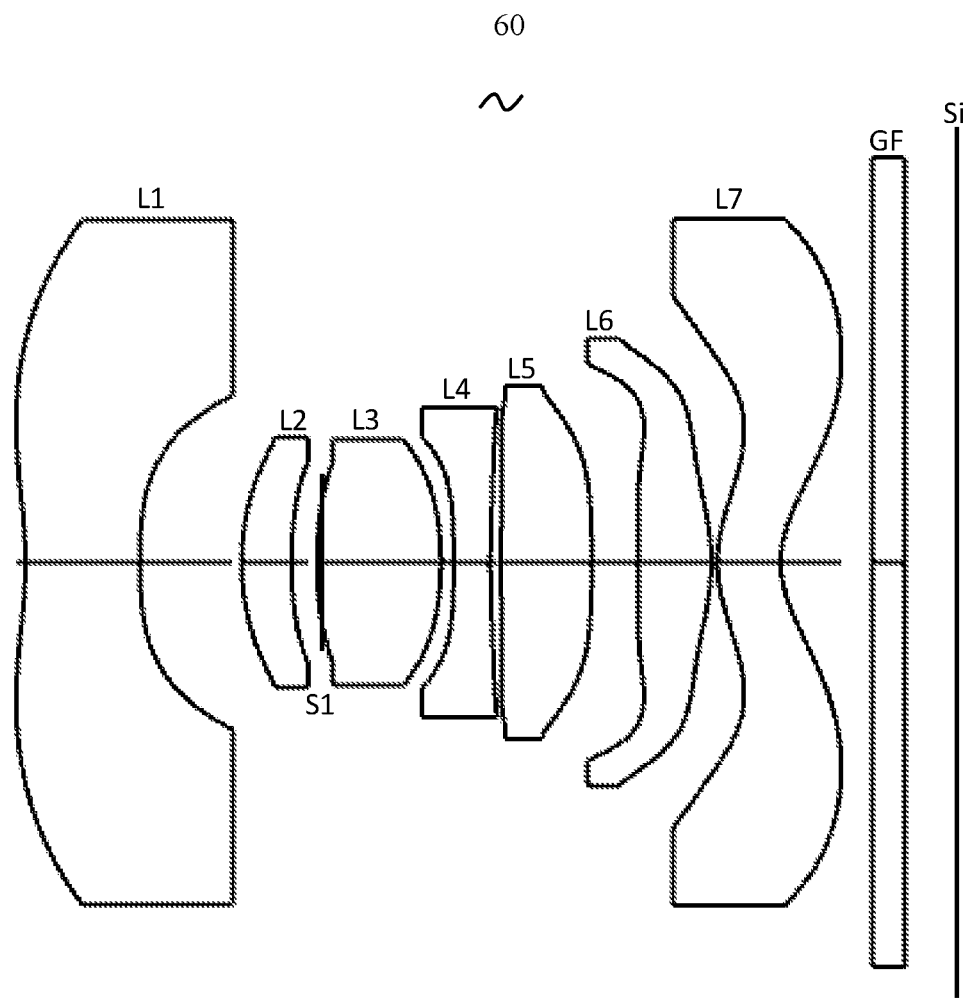
FIG. 11 is a schematic diagram of a structure of a camera optical lens in accordance with Embodiment 6 of the present disclosure.

FIG. 11 shows the camera optical lens 60 according to Embodiment 6 of the present disclosure. The camera optical lens 60 includes seven lenses. Specifically, the camera optical lens 60 includes, from an object side to an image side, a first lens L1 having a negative refractive power, a second lens L2 having a positive refractive power, an aperture S1, a third lens L3 having a positive refractive power, a fourth lens L4 having a negative refractive power, a fifth lens L5 having a positive refractive power, a sixth lens L6 having a positive refractive power, and a seventh lens L7 having a negative refractive power. An optical element such as an optical filter (GF) can be arranged between the seventh lens L7 and an image plane Si.

In this embodiment, the image-side surface of the second lens L2 is concave in the paraxial region, and the object-side surface of the third lens L3 is convex in the paraxial region.

Table 16 and Table 17 show design data of a camera optical lens 60 in Embodiment 6 of the present disclosure. The object-side surface and image-side surface of the first lens L1 are free-form surfaces.

TABLE 16

| | R | d | | nd | | vd |
|---|---|---|---|---|---|---|
| S1 | ∞ | d0= | −1.945 | | | |
| R1 | −2.726 | d1= | 0.749 | nd1 | 1.5444 v1 | 56.43 |
| R2 | 4.554 | d2= | 0.668 | | | |
| R3 | 1.978 | d3= | 0.325 | nd2 | 1.6610 v2 | 20.53 |
| R4 | 3.615 | d4= | 0.166 | | | |
| R5 | 3.103 | d5= | 0.811 | nd3 | 1.5444 v3 | 56.43 |
| R6 | −2.305 | d6= | 0.085 | | | |
| R7 | −6.655 | d7= | 0.240 | nd4 | 1.6800 v4 | 18.40 |
| R8 | 8.104 | d8= | 0.066 | | | |
| R9 | 7.166 | d9= | 0.597 | nd5 | 1.5444 v5 | 56.43 |
| R10 | −8.860 | d10= | 0.309 | | | |
| R11 | −4.676 | d11= | 0.474 | nd6 | 1.5444 v6 | 56.43 |
| R12 | −1.492 | d12= | 0.040 | | | |
| R13 | 1.000 | d13= | 0.413 | nd7 | 1.6032 v7 | 28.29 |
| R14 | 0.690 | d14= | 0.600 | | | |
| R15 | ∞ | d15= | 0.210 | ndg | 1.5168 vg | 64.17 |
| R16 | ∞ | d16= | 0.346 | | | |

Table 17 shows aspherical data of respective lenses in the camera optical lens 60 according to Embodiment 6 of the present disclosure.

TABLE 17

| | Conic coefficient | Aspherical coefficients | | | | |
|---|---|---|---|---|---|---|
| | k | A4 | A6 | A8 | A10 | A12 |
| R3 | −5.2169E+00 | 2.0382E−01 | −2.0766E−01 | 7.9087E−01 | −2.6257E+00 | 4.0678E+00 |
| R4 | 5.9007E+00 | 1.8044E−01 | 5.5490E−02 | −7.8413E−01 | 2.6983E+00 | −5.2333E+00 |

TABLE 17-continued

| | | | | | | |
|---|---|---|---|---|---|---|
| R5 | 2.0264E+00 | 1.1803E−01 | −2.7998E−02 | −1.4908E−01 | 6.1913E−01 | −2.0315E+00 |
| R6 | 2.5303E+00 | −8.6322E−02 | −6.0591E−01 | 4.0101E+00 | −1.8572E+01 | 5.5000E+01 |
| R7 | 1.0000E+01 | −9.1545E−02 | −7.2999E−01 | 3.4380E+00 | −1.4554E+01 | 3.5386E+01 |
| R8 | 1.0000E+01 | −7.7165E−02 | −1.4001E−01 | 1.8582E+00 | −6.8510E+00 | 1.3101E+01 |
| R9 | −8.6592E+00 | −2.2015E−01 | −2.9643E−03 | 1.3608E+00 | −3.1901E+00 | 3.0778E+00 |
| R10 | −1.0000E+01 | −2.9215E−02 | −2.2472E−01 | −3.4580E−01 | 1.9659E+00 | −3.7521E+00 |
| R11 | 6.5366E+00 | 5.8174E−01 | −1.0336E+00 | 1.5359E+00 | −2.0221E+00 | 1.9668E+00 |
| R12 | −3.2501E−01 | 3.7557E−01 | −3.3256E−01 | 7.4698E−01 | −1.3471E+00 | 1.3074E+00 |
| R13 | −2.7476E+00 | −2.4563E−01 | −5.3954E−02 | 2.9269E−01 | −3.7101E−01 | 2.4868E−01 |
| R14 | −2.4126E+00 | −2.6828E−01 | 2.0937E−01 | −1.2958E−01 | 5.7188E−02 | −1.7099E−02 |

| | Conic coefficient | Aspherical coefficients | | | |
|---|---|---|---|---|---|
| | k | A14 | A16 | A18 | A20 |
| R3 | −5.2169E+00 | −1.4696E+00 | −4.8901E+00 | 6.9361E+00 | −2.7494E+00 |
| R4 | 5.9007E+00 | 4.0688E+00 | 0.0000E+00 | 0.0000E+00 | 0.0000E+00 |
| R5 | 2.0264E+00 | 4.9615E+00 | −7.3853E+00 | 5.8135E+00 | −1.8472E+00 |
| R6 | 2.5303E+00 | −9.8736E+01 | 1.0458E+02 | −6.0327E+01 | 1.4668E+01 |
| R7 | 1.0000E+01 | −4.6743E+01 | 3.1804E+01 | −9.3812E+00 | 6.1576E−01 |
| R8 | 1.0000E+01 | −1.4363E+01 | 9.1334E+00 | −3.1446E+00 | 4.5377E−01 |
| R9 | −8.6592E+00 | −6.5908E−01 | −1.0926E+00 | 8.6392E−01 | −1.9505E−01 |
| R10 | −1.0000E+01 | 4.1338E+00 | −2.7364E+00 | 1.0040E+00 | −1.5538E−01 |
| R11 | 6.5366E+00 | −1.3584E+00 | 6.3168E−01 | −1.7755E−01 | 2.2584E−02 |
| R12 | −3.2501E−01 | −7.3551E−01 | 2.4234E−01 | −4.3418E−02 | 3.2810E−03 |
| R13 | −2.7476E+00 | −9.4786E−02 | 2.0615E−02 | −2.3834E−03 | 1.1363E−04 |
| R14 | −2.4126E+00 | 3.3512E−03 | −4.1077E−04 | 2.8455E−05 | −8.4696E−07 |

Table 18 shows free-form surface data in the camera optical lens 60 of Embodiment 6 of the present disclosure.

Figure 12:
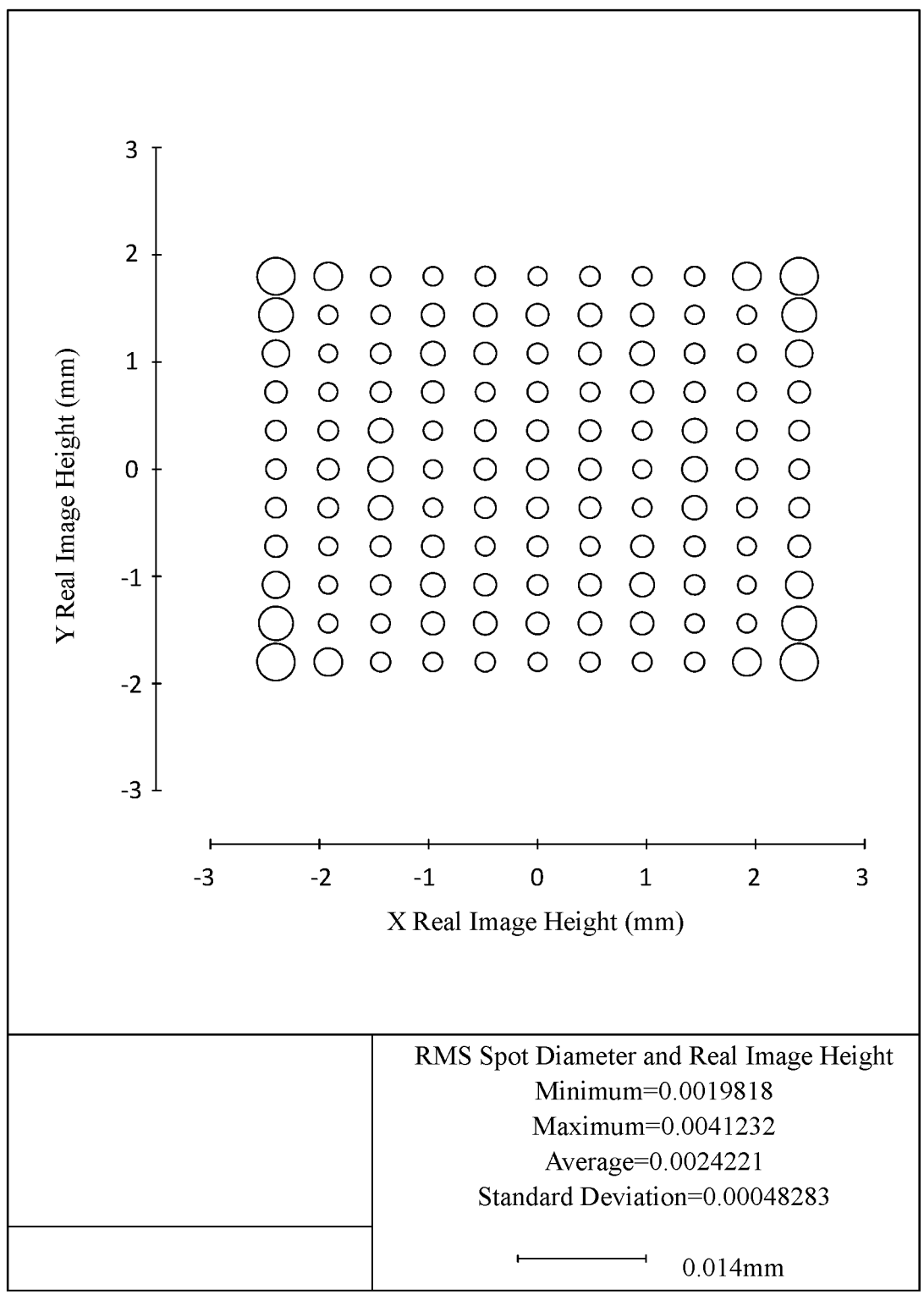
FIG. 12 is diagram showing a case where an RMS spot diameter of a camera optical lens shown in FIG. 11 is within a first quadrant.

FIG. 12 shows a situation where an RMS spot diameter of the camera optical lens 60 of Embodiment 6 is within a first

TABLE 18

Free-form surface coefficients

| | k | $X^4Y^0$ | $X^2Y^2$ | $X^0Y^4$ | $X^6Y^0$ | $X^4Y^2$ | $X^2Y^4$ | $X^0Y^6$ |
|---|---|---|---|---|---|---|---|---|
| R1 | −2.5000E+01 | 8.9975E−02 | 1.8008E−01 | 9.0038E−02 | −4.6928E−02 | −1.4098E−01 | −1.4083E−01 | −4.6988E−02 |
| R2 | −8.7787E+00 | 3.5842E−01 | 7.1806E−01 | 3.5773E−01 | −2.5371E−01 | −7.6155E−01 | −7.6023E−01 | −2.5052E−01 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R1 | −6.6035E−02 | −3.2985E−02 | −6.6152E−03 | 1.4560E−03 | 8.7353E−03 | 2.1827E−02 | 2.9112E−02 | 2.1854E−02 |
| R2 | −3.9652E+00 | −2.0394E+00 | −4.0480E−01 | 5.0368E−01 | 3.0166E+00 | 7.6350E+00 | 1.0107E+01 | 7.4569E+00 |

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R1 | −1.4399E−03 | −2.0502E−04 | 1.6598E−05 | 1.3258E−04 | 4.6607E−04 | 9.3115E−04 | 1.1633E−03 | 9.2885E−04 |
| R2 | −3.6304E+00 | −5.1172E−01 | 3.1062E−01 | 2.5015E+00 | 8.7146E+00 | 1.7132E+01 | 2.1724E+01 | 1.7731E+01 |

| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|---|
| R1 | −7.3719E−05 | −4.8998E−05 | −2.1752E−05 | −5.7459E−06 | −6.9555E−07 | 0.0000E+00 | 0.0000E+00 | 0.0000E+00 |
| R2 | −9.9268E+00 | −6.6090E+00 | −2.6822E+00 | −6.4183E−01 | −8.3223E−02 | 0.0000E+00 | 0.0000E+00 | 0.0000E+00 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R1 | 2.0531E−02 | 8.2242E−02 | 1.2328E−01 | 8.2109E−02 | 2.0593E−02 | −6.5998E−03 | −3.3020E−02 | −6.5989E−02 |
| R2 | 3.4578E−01 | 1.3685E+00 | 2.0605E+00 | 1.3789E+00 | 3.4417E−01 | −4.0270E−01 | −1.9847E+00 | −4.0312E+00 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R1 | 8.7257E−03 | 1.4525E−03 | −2.0529E−04 | −1.4362E−03 | −4.3112E−03 | −7.1876E−03 | −7.1826E−03 | −4.3110E−03 |
| R2 | 3.0956E+00 | 4.9994E−01 | −5.1612E−01 | −3.6378E+00 | −1.0878E+01 | −1.8147E+01 | −1.8091E+01 | −1.0824E+01 |

| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R1 | 4.6577E−04 | 1.3614E−04 | 1.7249E−05 | −5.8534E−07 | −5.2446E−06 | −2.1369E−05 | −4.9015E−05 | −7.4736E−05 |
| R2 | 8.6271E+00 | 2.4110E+00 | 3.1805E−01 | −7.6791E−02 | −6.9193E−01 | −2.8000E+00 | −6.2503E+00 | −9.4797E+00 |

| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|---|
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 | quadrant. According to FIG. 12, it can be known that the camera optical lens 60 of Embodiment 6 can achieve good imaging quality.

Table 19 below further lists values corresponding to various conditions in this embodiment according to the above conditions. Obviously, the camera optical lens according to this embodiment satisfies the above conditions.

In this embodiment, the entrance pupil diameter ENPD of the camera optical lens is 0.923 mm. The image height (along a diagonal direction) IH is 6.000 mm, an image height in the x direction is 4.800 mm, an image height in the y direction is 3.600 mm, and the imaging effect is the best in this rectangular range. The field of view (FOV) along a diagonal direction is 120.00°, an FOV in the x direction is 107.31°, and an FOV in the y direction is 89.55°. Thus, the camera optical lens 60 satisfies design requirements of ultra-thin, large-aperture, and wide-angle while having on-axis and off-axis aberrations sufficiently corrected, thereby leading to better optical characteristics.

TABLE 19

| Parameters and Conditions | Embodiment 1 | Embodiment 2 | Embodiment 3 | Embodiment 4 | Embodiment 5 | Embodiment 6 |
|---|---|---|---|---|---|---|
| f | 1.716 | 1.728 | 1.817 | 1.762 | 1.800 | 1.800 |
| f1 | −3.10 | −2.94 | −3.34 | −2.86 | −3.03 | −3.01 |
| f2 | 2.92 | 1.96 | 3.28 | 1.81 | 6.96 | 6.07 |
| f3 | 5.064 | −15.873 | 4.001 | −8.850 | 2.034 | 2.557 |
| f4 | −3.58 | −3.68 | −3.78 | −4.01 | −4.23 | −5.29 |
| f5 | 5.929 | 4.081 | 8.377 | 4.199 | 11.850 | 7.351 |
| f6 | 1.871 | 2.245 | 2.030 | 2.481 | 4.267 | 3.813 |
| f7 | −2.161 | −3.052 | −2.750 | −3.764 | −11.293 | −7.392 |
| FNO | 1.85 | 1.85 | 1.85 | 1.85 | 1.95 | 1.95 |
| TTL | 6.710 | 6.711 | 6.710 | 6.710 | 6.100 | 6.099 |
| IH | 6.000 | 6.000 | 6.000 | 6.000 | 6.000 | 6.000 |
| FOV | 120.90° | 121.12° | 121.23° | 121.17° | 120.00° | 120.00° |

It can be appreciated by one having ordinary skill in the art that the description above is only embodiments of the present disclosure. In practice, one having ordinary skill in the art can make various modifications to these embodiments in forms and details without departing from the spirit and scope of the present disclosure.

What is claimed is:

1. A camera optical lens, comprising, from an object side to an image side:
   a first lens having a negative refractive power;
   a second lens having a positive refractive power;
   a third lens;
   a fourth lens having a negative refractive power;
   a fifth lens having a positive refractive power;
   a sixth lens having a positive refractive power; and
   a seventh lens having a negative refractive power,
   wherein at least one of the first lens, the second lens, the third lens, the fourth lens, the fifth lens, the sixth lens, or the seventh lens comprises a free-form surface, and
   wherein the camera optical lends satisfies: $1.50 \leq d2/d3 \leq 4.00$, where d2 denotes an on-axis distance from an image-side surface of the first lens to an object-side surface of the second lens, and d3 denotes an on-axis thickness of the second lens.

2. The camera optical lens as described in claim 1, wherein the camera optical lens satisfies:

$$-3.68 \leq f1/f \leq -1.08;$$

$$-0.50 \leq (R1+R2)/(R1-R2) \leq 1.66; \text{ and}$$

$$0.03 \leq d1/TTL \leq 0.19$$

where f denotes a focal length of the camera optical lens, f1 denotes a focal length of the first lens, R1 denotes a central curvature radius of an object-side surface of the first lens, R2 denotes a central curvature radius of an image-side surface of the first lens, d1 denotes an on-axis thickness of the first lens, and TTL denotes a total optical length from the object-side surface of the first lens to an image plane of the camera optical lens along an optic axis.

3. The camera optical lens as described in claim 1, wherein the camera optical lens satisfies:

$$0.5 \leq f2/f \leq 5.80;$$

$$-8.28 \leq (R3+R4)/(R3-R4) \leq 0.19; \text{ and}$$

$$0.02 \leq d3/TTL \leq 0.16,$$

where f denotes a focal length of the camera optical lens, f2 denotes a focal length of the second lens, R3 denotes a central curvature radius of an object-side surface of the second lens, R4 denotes a central curvature radius of an image-side surface of the second lens, d3 denotes an on-axis thickness of the second lens, and TTL denotes a total optical length from an object-side surface of the first lens to an image plane of the camera optical lens along an optic axis.

4. The camera optical lens as described in claim 1, wherein the camera optical lens satisfies:

$$-18.3 \leq f3/f \leq 4.43;$$

$$-3.09 \leq (R5+R6)/(R5-R6) \leq 1.98; \text{ and}$$

$$0.02 \leq d5/TTL \leq 0.21,$$

where f denotes a focal length of the camera optical lens, f3 denotes a focal length of the third lens, R5 denotes a central curvature radius of an object-side surface of the third lens, R6 denotes a central curvature radius of an image-side surface of the third lens, d5 denotes an on-axis thickness of the third lens, and TTL denotes a total optical length from an object-side surface of the first lens to an image plane of the camera optical lens along an optic axis.

5. The camera optical lens as described in claim 1, wherein the camera optical lens satisfies:

$$-5.87 \leq f4/f \leq -1.39;$$

$$-0.23 \leq (R7+R8)/(R7-R8) \leq 2.09; \text{ and}$$

$$0.02 \leq d7/TTL \leq 0.06;$$

where f denotes a focal length of the camera optical lens, f4 denotes a focal length of the fourth lens, R7 denotes a central curvature radius of an object-side surface of the fourth lens, R8 denotes a central curvature radius of an image-side surface of the fourth lens, d7 denotes an on-axis thickness of the fourth lens, and TTL denotes a total optical length from an object-side surface of the first lens to an image plane of the camera optical lens along an optic axis.

6. The camera optical lens as described in claim 1, wherein the camera optical lens satisfies:

$$1.18 \leq f5/f \leq 9.88;$$

$$-1.67 \leq (R9+R10)/(R9-R10) \leq 0.54; \text{ and}$$

$$0.04 \leq d9/TTL \leq 0.15,$$

where f denotes a focal length of the camera optical lens, f5 denotes a focal length of the fifth lens, R9 denotes a central curvature radius of an object-side surface of the fifth lens, R10 denotes a central curvature radius of an image-side surface of the fifth lens, d9 denotes an on-axis thickness of the fifth lens, and TTL denotes a total optical length from an object-side surface of the first lens to an image plane of the camera optical lens along an optic axis.

7. The camera optical lens as described in claim 1, wherein the camera optical lens satisfies:

$$0.55 \leq f6/f \leq 3.56;$$

$$0.67 \leq (R11+R12)/(R11-R12) \leq 3.57; \text{ and}$$

$$0.04 \leq d11/TTL \leq 0.17,$$

where f denotes a focal length of the camera optical lens, f6 denotes a focal length of the sixth lens, R11 denotes a central curvature radius of an object-side surface of the sixth lens, R12 denotes a central curvature radius of an image-side surface of the sixth lens, d11 denotes an on-axis thickness of the sixth lens, and TTL denotes a total optical length from an object-side surface of the first lens to an image plane of the camera optical lens along an optic axis.

8. The camera optical lens as described in claim 1, wherein the camera optical lens satisfies:

$$-12.55 \leq f7/f \leq -0.84;$$

$$1.40 \leq (R13+R14)/(R13-R14) \leq 9.96; \text{ and}$$

$$0.03 \leq d13/TTL \leq 0.10,$$

where f denotes a focal length of the camera optical lens, f7 denotes a focal length of the seventh lens, R13 denotes a central curvature radius of an object-side surface of the seventh lens, R14 denotes a central curvature radius of an image-side surface of the seventh lens, d13 denotes an on-axis thickness of the seventh lens, and TTL denotes a total optical length from an object-side surface of the first lens to an image plane of the camera optical lens along an optic axis.

9. The camera optical lens as described in claim 1, wherein the camera optical lens satisfies: FNO≤1.96, where FNO denotes an F number of the camera optical lens.

* * * * *